(12) United States Patent
Kumar

(10) Patent No.: US 12,526,805 B2
(45) Date of Patent: Jan. 13, 2026

(54) SYSTEMS AND METHODS FOR IMPROVED UL PERFORMANCE WITH SRS ANTENNA SWITCHING

(71) Applicant: QUALCOMM Incorporated, San Diego, CA (US)

(72) Inventor: Akash Kumar, Hyderabad (IN)

(73) Assignee: Qualcomm Incorporated, San Diego, CA (US)

(*) Notice: Subject to any disclaimer, the term of this patent is extended or adjusted under 35 U.S.C. 154(b) by 432 days.

(21) Appl. No.: 17/823,693

(22) Filed: Aug. 31, 2022

(65) Prior Publication Data
US 2024/0073904 A1    Feb. 29, 2024

(51) Int. Cl.
| | | |
|---|---|---|
| *H04W 72/21* | (2023.01) | |
| *H04L 1/00* | (2006.01) | |
| *H04L 5/00* | (2006.01) | |
| *H04W 24/10* | (2009.01) | |

(52) U.S. Cl.
CPC .......... *H04W 72/21* (2023.01); *H04L 1/0057* (2013.01); *H04L 5/0048* (2013.01); *H04W 24/10* (2013.01)

(58) Field of Classification Search
None
See application file for complete search history.

(56) References Cited

U.S. PATENT DOCUMENTS

| | | |
|---|---|---|
| 2019/0260533 A1 | 8/2019 | Manolakos et al. |
| 2019/0349066 A1* | 11/2019 | Yang ................ H04B 7/0697 |
| 2019/0349972 A1* | 11/2019 | Nam ..................... H04L 5/00 |
| 2020/0382250 A1 | 12/2020 | Choi et al. |
| 2023/0224124 A1* | 7/2023 | Nilsson ............ H04L 5/0094 |
| | | 370/330 |
| 2023/0327721 A1* | 10/2023 | Huang ............. H04B 7/0608 |
| | | 375/267 |

FOREIGN PATENT DOCUMENTS

| | | |
|---|---|---|
| EP | 4192166 A1 | 6/2023 |
| WO | 2022033550 A1 | 2/2022 |

OTHER PUBLICATIONS

Partial International Search Report—PCT/US2023/030487—ISA/EPO—Dec. 19, 2023.
International Search Report and Written Opinion—PCT/US2023/030487—ISA/EPO—Feb. 9, 2024.

* cited by examiner

*Primary Examiner* — Saad Khawar
(74) *Attorney, Agent, or Firm* — Harrity & Harrity, LLP

(57) ABSTRACT

Systems and methods for improved UL performance with SRS antenna switching are provided. A UE may adjust antenna selections and/or antenna switch timing to account for excessive transmission errors due to antenna switching between SRS and PUSCH transmissions. A UE may monitor CRC error rates, and if PUSCH resources next to SRS resources have higher CRC rates above a threshold, the UE may determine if an RSRP difference between the respective antennas is below a threshold. If the RSRP difference is below the threshold, the UE may determine that the antenna port used for SRS may also be used by PUSCH without substantially detrimentally affecting PUSCH. A UE may also determine which SRS resources occurs adjacent to a PUSCH resource most often and assign that SRS resource to a default antenna which may be used for PUSCH transmission. A UE may also adjust antenna switch timing.

30 Claims, 12 Drawing Sheets

SYSTEMS AND METHODS FOR IMPROVED UL PERFORMANCE WITH SRS ANTENNA SWITCHING

TECHNICAL FIELD

This application relates to wireless communication devices, systems, and methods, and more particularly to devices, systems, and methods for improved uplink (UL) performance with SRS antenna switching.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G), designed to provide a lower latency, a higher bandwidth or a higher throughput, and a higher reliability than LTE.

UEs may communicate using a number of antenna which may be switched to connect to different transmit chains at different times. For example, a sounding reference signal (SRS) may be transmitted using one antenna port, and a physical uplink shared channel (PUSCH) may be transmitted using another antenna port. If the SRS and PUSCH transmission occur next to each other in time, the time it takes to switch antenna ports may cause errors on the SRS and/or PUSCH transmission. Therefore, there exists a need for improved methods of SRS antenna switching.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One aspect of the present disclosure includes a method of wireless communication, comprising receiving, by a user equipment (UE) from a network unit, a plurality of physical uplink shared channel (PUSCH) resources associated with respective default antenna ports, wherein a first subset of the plurality of PUSCH resources are each directly before or after in time a respective sounding reference signal (SRS) resource without an intervening symbol, and wherein a second subset of the plurality of PUSCH resources have at least one symbol before and after in time without any SRS resource. The method further comprises transmitting a PUSCH associated with the first subset on a non-default antenna port, the non-default antenna port being the same as the antenna port of the respective SRS resource, in response to a failure rate of the first subset being above a first predetermined threshold higher than a failure rate of the second subset, and a channel measurement associated with the non-default antenna port meeting a predetermined requirement.

Another aspect of the present disclosure includes a user equipment (UE), comprising a transceiver configured to receive, from a network unit, a plurality of physical uplink shared channel (PUSCH) resources associated with respective default antenna ports, wherein a first subset of the plurality of PUSCH resources are each directly before or after in time a respective sounding reference signal (SRS) resource without an intervening symbol, and wherein a second subset of the plurality of PUSCH resources have at least one symbol before and after in time without any SRS resource. The transceiver is further configured to transmit a PUSCH associated with the first subset on a non-default antenna port, the non-default antenna port being the same as the antenna port of the respective SRS resource, in response to a failure rate of the first subset being above a first predetermined threshold higher than a failure rate of the second subset, and a channel measurement associated with the non-default antenna port meeting a predetermined requirement.

Another aspect of the present disclosure includes a method of wireless communication, comprising receiving, by a user equipment (UE) from a network unit, a plurality of physical uplink shared channel (PUSCH) resources. The method further comprises receiving, by the UE from the network unit, a plurality of sounding reference signal (SRS) resources, wherein a first subset of the plurality of PUSCH resources are each directly before or after in time a respective sounding reference signal (SRS) resource of the plurality of SRS resources without an intervening symbol, and wherein a second subset of the plurality of PUSCH resources have at least one symbol before and after in time without any SRS resource. The method further comprises determining, by the UE, an SRS resource of the plurality of SRS resources that most often occurs adjacent in time to a PUSCH resource of the plurality of PUSCH resources. The method further comprises mapping, by the UE, the SRS resource to a selected antenna port which is used for PUSCH transmission. The method further comprises transmitting, by the UE, an SRS using the selected antenna port.

Another aspect of the present disclosure includes a method of wireless communication, comprising receiving, by a user equipment (UE) from a network unit, a plurality of physical uplink shared channel (PUSCH) resources. The method further comprises receiving, by the UE from the network unit, a plurality of sounding reference signal (SRS) resources, wherein a first subset of the plurality of PUSCH resources are each directly before or after in time a respective sounding reference signal (SRS) resource of the plurality of SRS resources without an intervening symbol, and wherein a second subset of the plurality of PUSCH resources have at least one symbol before and after in time without any SRS resource. The method further comprises adjusting a timing of an antenna switching event based on a determination of a relative importance of downlink compared to uplink.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
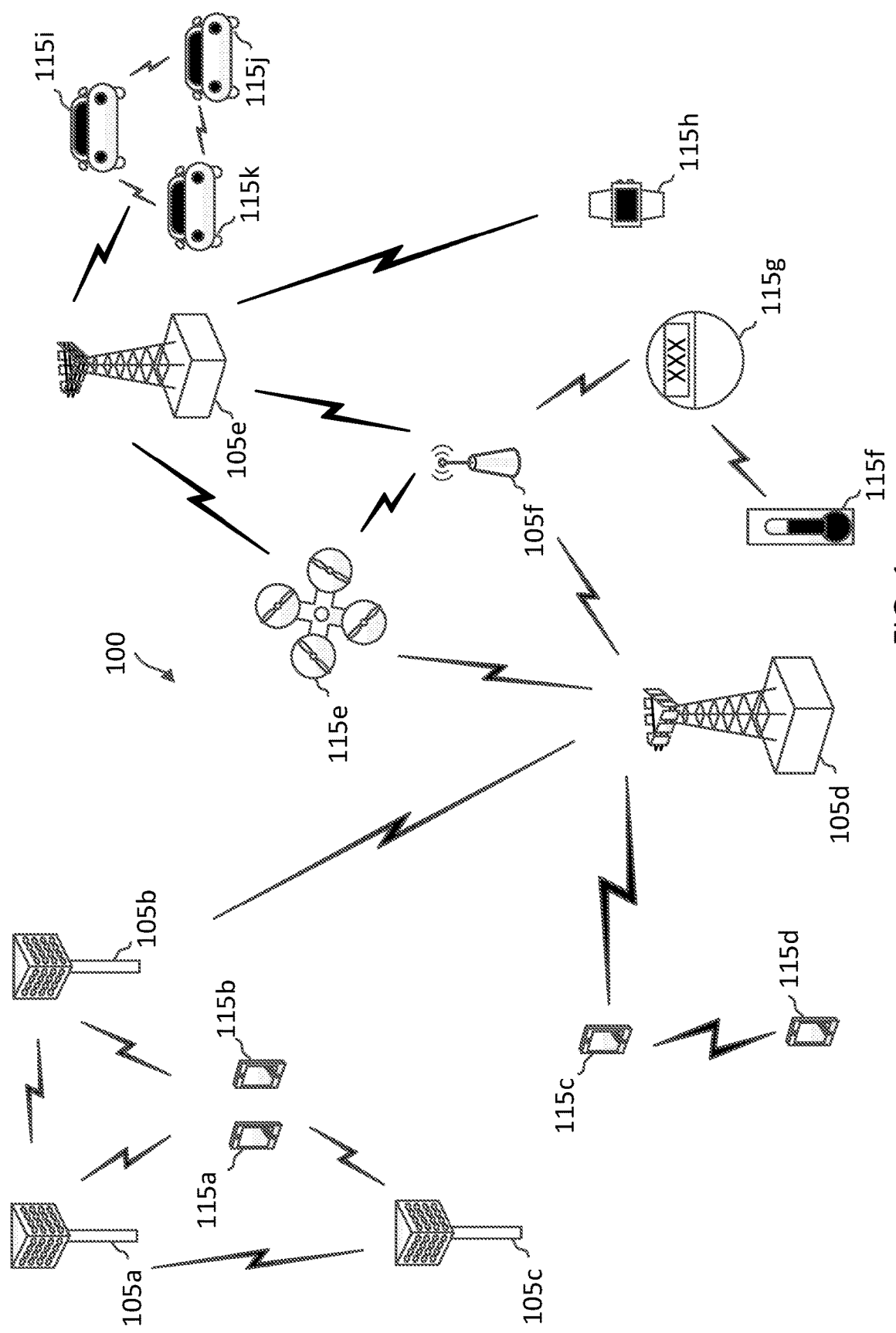
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into multiple different frequency ranges, a frequency range one (FR1), a frequency range two (FR2), and FR2x. FR1 bands include frequency bands at 7 GHz or lower (e.g., between about 410 MHz to about 7125 MHz). FR2 bands include frequency bands in mmWave ranges between about 24.25 GHz and about 52.6 GHz. FR2x bands include frequency bands in mmWave ranges between about 52.6 GHz to about 71 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UK/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present disclosure describes systems and methods for improving uplink (UL) performance with SRS antenna switching. Many UE devices contain an antenna switch, which allow the UE to transmit using different antennas by changing which antenna is connected to a transmit processing chain. For example, a sounding reference signal (SRS) may be transmitted on an antenna, and then the antenna connected to that transmit chain may switch to allow a physical uplink shared channel (PUSCH) message may be transmitted on a different same antenna. In some instances, the SRS transmission and the PUSCH transmission are scheduled for adjacent symbols, which does not allow time for any transient effects of antenna switching to settle. Depending on the antenna switching characteristics, antenna and channel characteristics etc., the switching transient effect may be sufficient to cause transmission errors.

Methods described herein may reduce the number of errors associated with antenna switching. In some aspects, a UE may have a number of scheduled SRS and PUSCH resources, some of which are adjacent to each other. The UE may monitor for PUSCH errors to determine if the PUSCH transmission which are adjacent to SRS transmissions have higher error rates than those that do not. This may indicate to the UE that the antenna switching related to the SRS transmission is the main cause of errors. If the errors for PUSCHs adjacent to SRSs is more than a predetermined threshold higher than other PUSCHs, the UE may determine if the SRS channel is suitable for PUSCH transmission. The UE may determine this by comparing reference signal received power (RSRP) measurements between the PUSCH antenna and the SRS antenna.

If the difference between the two RSRP values is below a threshold, this may indicate to the UE that the SRS channel is suitable for PUSCH. Even if the SRS channel is slightly worse (within the predetermined threshold), it may still be beneficial to transmit PUSCH on the SRS channel since the reduction in performance due to an inferior channel is less than the performance degradation due to antenna switching. Further, some reduction in channel performance may be mitigated by increasing transmit power for PUSCH. If the UE make the determination that the SRS channel is suitable, it may transmit PUSCH on the same antenna as SRS, thereby avoiding antenna switching.

The UE may continue to monitor the improvement in the percentage of failures for PUSCH transmissions. If, for example, PUSCH transmission errors increase to unsuitable levels on the SRS antenna, then the UE may determine to revert to the default PUSCH antenna for PUSCH transmissions.

In some aspects, the UE may change the SRS transmit antenna rather than PUSCH. However, SRS signals are generally transmitted on multiple antennas in a round-robin fashion so that the base station may characterize the performance of all the channels. The UE may determine, based on the scheduling pattern, which SRS resource is most often adjacent to a PUSCH resource. Based on the determination, the UE may map that SRS resource to the antenna associated with the adjacent PUSCH resource.

In yet further aspects, the UE may determine if uplink (UL) or downlink (DL) is more important currently. Based on this determination, the UE may adjust the antenna switch timing such that SRS or PUSCH is more affected, alleviating the other. For example, one factor may be based on a comparison of how many downlink layers are configured compared to a maximum possible number of downlink layers available. If not all available downlink layers are configured, this may indicate that downlink is not being heavily used currently and is therefore less important than uplink. Another factor may be the amount of block errors associated with PUSCHs not adjacent to SRSs being over a predetermined threshold. For example, this may indicate that the current conditions are such that there is a poor connection for PUSCH resources, which may be further worsened by choosing a suboptimal channel. Another factor may be whether the PUSCH transmission is type "B" in which case the performance of the first symbol of PUSCH is of extra importance, as the first symbol of type "B" PUSCH transmissions is a demodulation reference signal (DMRS).

Systems and methods described herein provide many advantages. PUSCH errors may be reduced by changing antenna resources. This may be done without adding a gap symbol between SRS and PUSCH transmissions, thereby continuing to efficiently use the resources available. By only switching antenna allocation based on channel performance measurements, this ensures that resources are not changed only to worsen PUSCH performance. By conserving SRS signal integrity, a base station is able to more accurately characterize channel performance for UL, and by reciprocity for DL. This may allow DL performance to be maintained or enhanced.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support communications with ultra-reliable and redundant links for devices with high reliability requirements, such as the UE 115e, which may be a flying device. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate an UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. an UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 15 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, an UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as COT. The goal of LBT is to protect reception at a receiver from interference. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

A BS 105 may schedule a UE 115 with resources for UL transmissions. For example, SRS and PUSCH transmissions may be scheduled for a UE 115. In some instances, SRS and PUSCH resources may be scheduled adjacent to each other, with no symbol between them. Depending on which antenna resources the UE 115 has mapped for the resources, the UE 115 may switch antennas between the SRS and the PUSCH transmissions. In some aspects, a UE may determine that PUSCH errors are occurring for PUSCH resources adjacent to SRS resources, and may adjust antenna mappings or antenna switch timing in order to mitigate the errors.

Deployment of communication systems, such as 5G new radio (NR) systems, may be arranged in multiple manners with various components or constituent parts. In a 5G NR system, or network, a network node, a network entity, a network unit, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS 105 (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
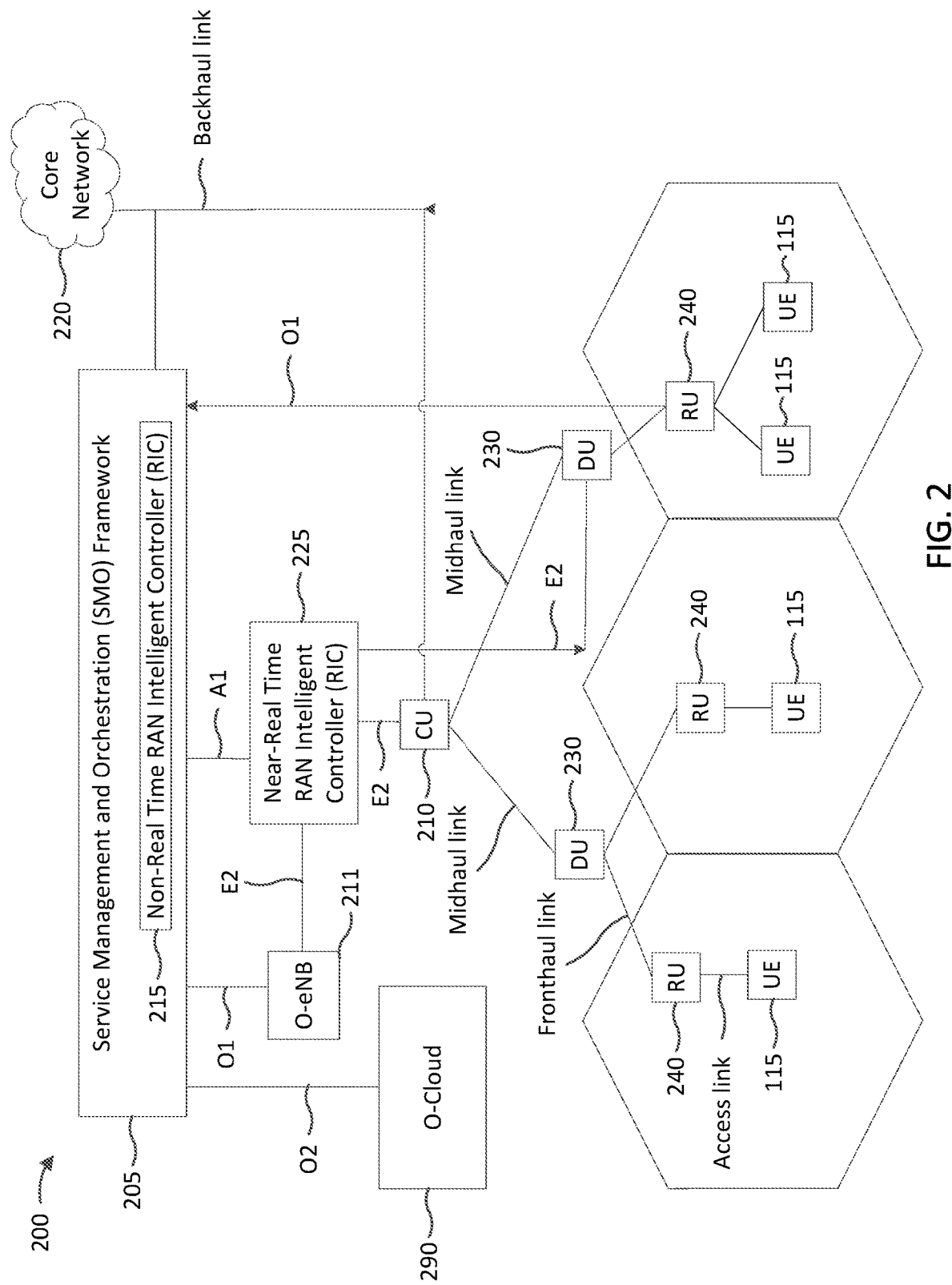
FIG. 2 illustrates an example portion of a wireless communications system that supports RU sharing techniques in wireless communications according to some aspects of the present disclosure.

FIG. 2 shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 115 via one or more radio frequency (RF) access links. In some implementations, the UE 115 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit—User Plane (CU-UP)), control plane functionality (i.e., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 115. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
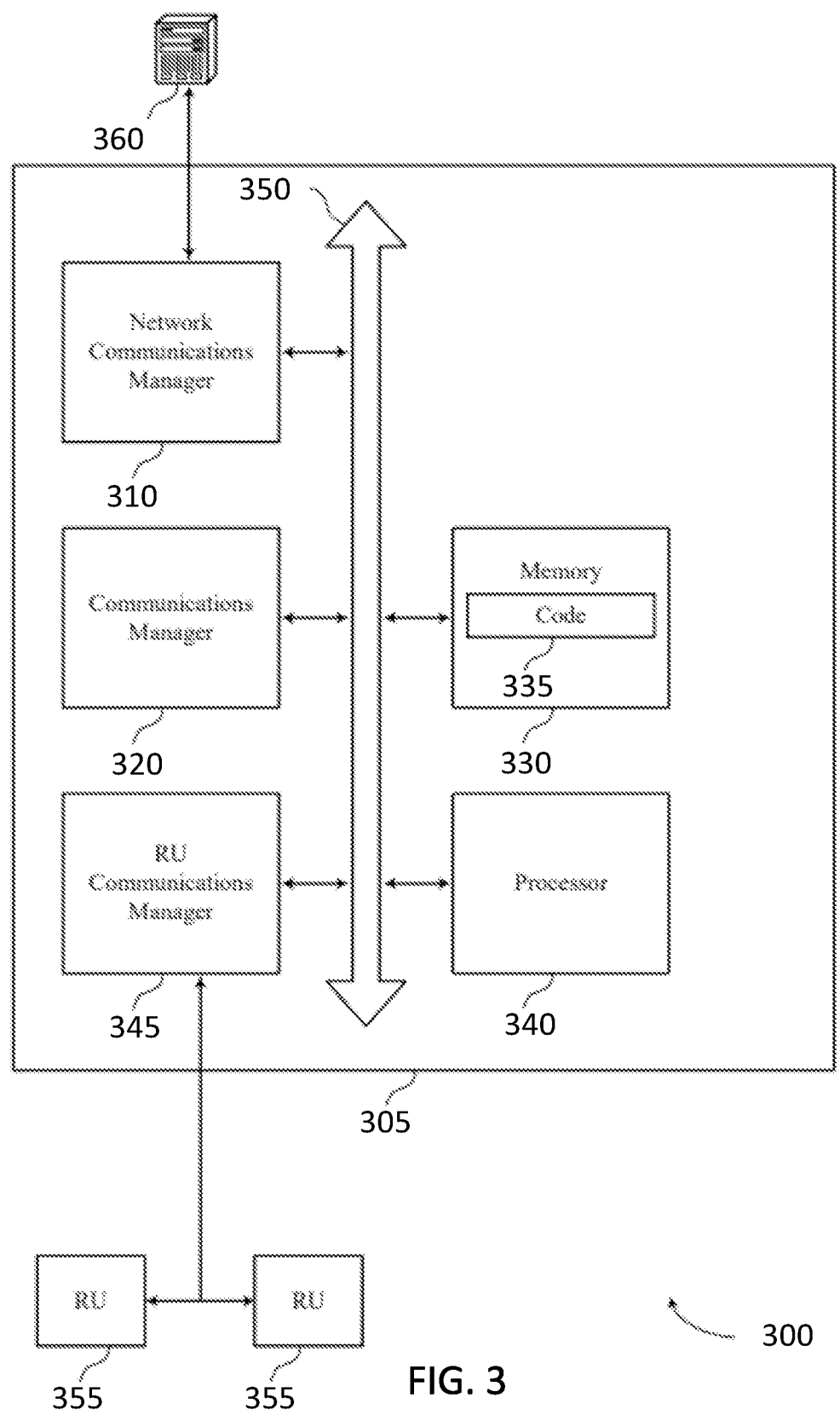
FIG. 3 illustrates a diagram of a system including a device that supports RU sharing techniques in wireless communications according to some aspects of the present disclosure.

FIG. 3 shows a diagram of a system 300 including a device 305 that supports RU sharing techniques in wireless communications in accordance with aspects of the present disclosure. The device 305 may communicate with one or more RUs 355. The device 305 may include components for bi-directional voice and data communications including components for transmitting and receiving communications, such as a communications manager 320, a network communications manager 310, a memory 330, code 335, a processor 340, and a RU communications manager 345. These components may be in electronic communication or otherwise coupled (e.g., operatively, communicatively, functionally, electronically, electrically) via one or more buses (e.g., a bus 350). One or more of the components of system 300 may perform functions as described herein with reference to FIGS. 4-12, for example functions described as performed by a base station or network unit.

The network communications manager 310 may manage communications with a core network 360 (e.g., via one or more wired backhaul links). For example, the network communications manager 310 may manage the transfer of data communications for client devices, such as one or more UEs 115.

The memory 330 may include RAM and ROM. The memory 330 may store computer-readable, computer-executable code 335 including instructions that, when executed by the processor 340, cause the device 305 to perform various functions described herein. The code 335 may be stored in a non-transitory computer-readable medium such as system memory or another type of memory. In some cases, the code 335 may not be directly executable by the processor 340 but may cause a computer (e.g., when compiled and executed) to perform functions described herein. In some cases, the memory 330 may contain, among other things, a BIOS which may control basic hardware or software operation such as the interaction with peripheral components or devices.

The processor 340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 340 may be configured to operate a memory array using a memory controller. In some other cases, a memory controller may be integrated into the processor 340. The processor 340 may be configured to execute computer-readable instructions stored in a memory (e.g., the memory 330) to cause the device 305 to perform various functions (e.g., functions or tasks supporting RU sharing techniques in wireless communications). For example, the device 305 or a component of the device 305 may include a processor 340 and memory 330 coupled to the processor 340, the processor 340 and memory 330 configured to perform various functions described herein.

The RU communications manager 345 may manage communications with RUs 355, and may include a controller or scheduler for controlling communications with UEs 115 in cooperation with RUs 355. For example, the RU communications manager 345 may coordinate scheduling for transmissions to UEs 115. In some examples, the RU communications manager 345 may provide an F1 interface within a wireless communications network technology to provide communication with RUs 355.

The communications manager 320 may support wireless communications at a network node in accordance with examples as disclosed herein. For example, the communications manager 320 may be configured as or otherwise support a means for transmitting, to a first RU, a request for a wireless resource configuration for a first time period. The communications manager 320 may be configured as or otherwise support a means for transmitting, to a second RU, an interference inquiry associated with the wireless resource configuration for the first time period. The communications manager 320 may be configured as or otherwise support a means for receiving, from the second RU, a response to the interference inquiry. The communications manager 320 may be configured as or otherwise support a means for transmitting, based on the response to the interference inquiry, a payload to the first RU for transmission during the first time period.

By including or configuring the communications manager 320 in accordance with examples as described herein, the device 305 may support techniques for RU sharing in which DUs of different MNOs may access wireless resources of other MNOs, which may increase efficiency of resource usage while provide for competition and innovation among different MNOs, may increase the reliability of wireless communications, decrease latency, and enhance user experience.

In some examples, the communications manager 320 may be configured to perform various operations (e.g., receiving, monitoring, transmitting) using or otherwise in cooperation with other components. Although the communications manager 320 is illustrated as a separate component, in some examples, one or more functions described with reference to the communications manager 320 may be supported by or performed by the processor 340, the memory 330, the code 335, or any combination thereof. For example, the code 335 may include instructions executable by the processor 340 to cause the device 305 to perform various aspects of RU sharing techniques in wireless communications as described herein, or the processor 340 and the memory 330 may be otherwise configured to perform or support such operations.

Figure 4:
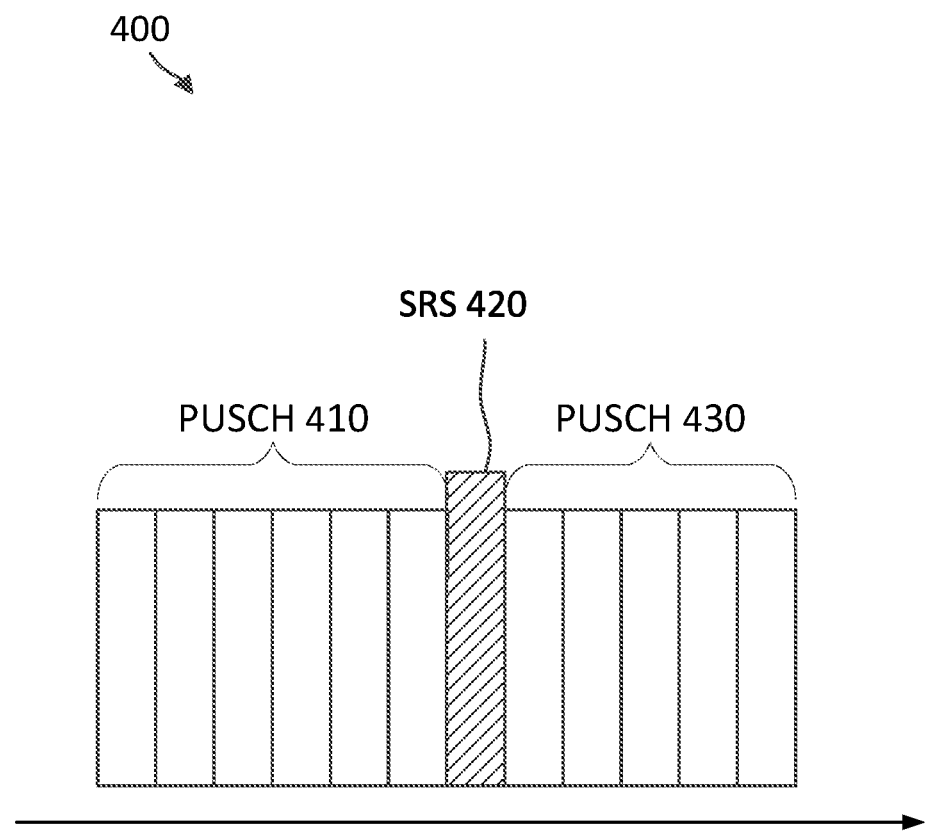
FIG. 4 illustrates an exemplary transmission timing with SRS adjacent to PUSCH.

FIG. 4 illustrates an exemplary transmission timing 400 with SRS adjacent to PUSCH. The x-axis represents time in some units, with the individual divisions of the illustrated resources representing symbol periods. As shown PUSCH 410 is scheduled up to and adjacent to SRS 420. Further, PUSCH 430 is scheduled to begin immediately after SRS 420. In either of these cases (PUSCH immediately before or after SRS), errors may be present on PUSCH and/or SRS transmission due to antenna switching effects. The timing of an antenna switch event may be controlled at a granularity less than a symbol period. In this way, the switching transient may affect more the end of the preceding transmission, or the beginning of the subsequent transmission in an adjacent pair. If the PUSCH transmission is a type "B" PUSCH, then the first symbol of the PUSCH may be reserved for a demodulation reference signal (DMRS). A DMRS may be especially sensitive and/or important, and therefore there may be more motivation to make a mitigating adjustment when an SRS is immediately before a type "B" PUSCH transmission.

Figure 5:
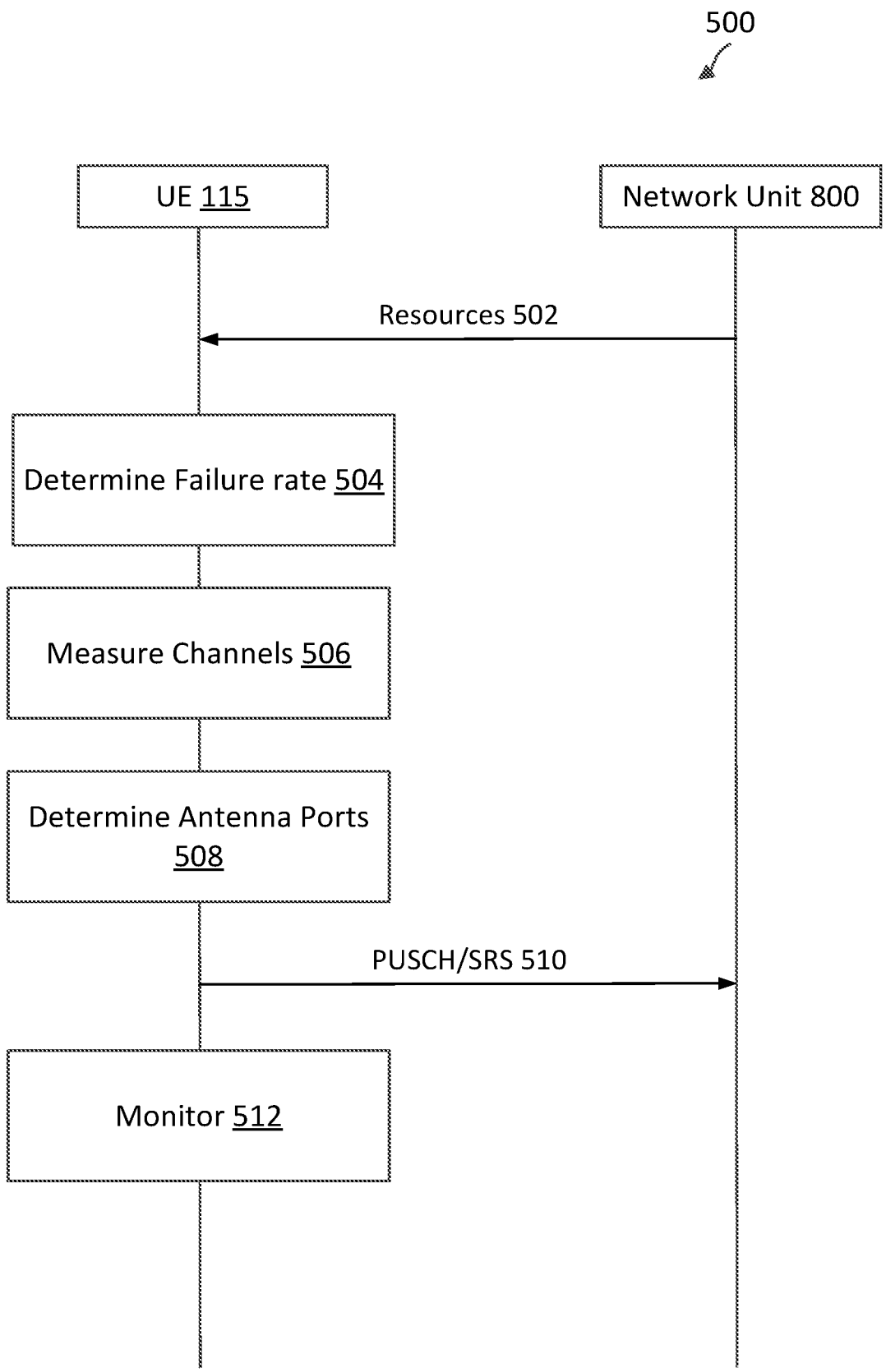
FIG. 5 is a signaling diagram according to some aspects of the present disclosure.

FIG. 5 is a signaling diagram 500 according to some aspects of the present disclosure. The diagram 500 is employed by a network unit 800 such as a BS 105, discussed with reference to FIG. 1, one or more components of disaggregated base station 200 (e.g., CU 210, DU 230, and/or RU 240) discussed with reference to FIGS. 2-3. Network unit 800 may utilize one or more components, such as the processor 802, the memory 804, the scheduling module 808, the transceiver 810, the modem 812, and the one or more antennas 816 shown in FIG. 8, and the UE 115 may utilize one or more components, such as the processor 902, the memory 904, the antenna switching module 908, the transceiver 910, the modem 912, and the one or more antennas 916 shown in FIG. 9. As illustrated, the signaling diagram 500 includes a number of enumerated actions, but aspects of FIG. 5 may include additional actions before, after, and in between the enumerated actions. In some aspects, one or more of the enumerated actions may be omitted, combined together, or performed in a different order.

At action 502, UE 115 receives, from network unit 800, an indication of PUSCH and SRS resources associated with respective antenna ports. The indication may be received, for example dynamically via DCI on PDCCH, an RRC configuration, or other methods. Each PUSCH resource of a first subset of the PUSCH resources may be directly before and/or after in time a respective SRS resource (e.g., in an adjacent symbol to the SRS resource). Each PUSCH resource of a second subset of the PUSCH resources may be spaced in time from any SRS resources (e.g., at least one intervening symbol is positioned between the PUSCH resource and any SRS resource). In some instances, a communication is considered to be directly before or directly after when there are no symbols between the communication and another communication (e.g., as discussed with respect to FIG. 4).

At action 504, UE 115 determines a failure rate associated with the PUSCH transmissions. For example, the UE may monitor for CRC failures based on retransmission requests from the network unit 800 in a DCI message communicated via PDCCH. If a predetermined amount of time has lapsed since a PUSCH transmission without a retransmission request, UE 115 may assume that there was no CRC error. UE 115 may track PUSCH failures for PUSCH resources that are adjacent to SRS resources (e.g., the first subset of PUSCH resources) separately from PUSCH failures for PUSCH resources that are not adjacent to SRS resources (e.g., the second subset of PUSCH resources). In some aspects, PUSCH resources with an SRS directly before or after the PUSCH resource are tracked. In other aspects, only PUSCH resources with SRSs before (but not after) are tracked. In this regard, interference with the beginning of a PUSCH communication may be more detrimental than interference at the end of the PUSCH communication.

UE 115 may determine whether PUSCH resources adjacent to SRS resources (e.g., the first subset of PUSCH resources) have a higher percentage failure rate than PUSCH resources not adjacent to an SRS (e.g., the second subset of PUSCH resources). If CRC errors are not more than a predetermined threshold higher when adjacent to an SRS, the UE 115 may keep the default antenna port settings. For example, if CRC errors for PUSCH resources in the first subset are 4%, and PUSCH resource in the second subset are 5%, and the predetermined threshold is a difference of 2%, then UE 115 may determine to continue using default antennas. If CRC errors are more than a predetermined threshold higher when adjacent to an SRS, then UE 115 may perform action 506 as described below.

At action 506, UE 115 measures the channels associated with the SRS and PUSCH resources. UE 115 may determine whether a difference in the reference signal received power (RSRP) associated with the antennas of interest is less than a predetermined threshold. For example, for a PUSCH and SRS pair, each mapped to a different antenna port, UE 115 may determine whether the channel associated with the PUSCH as characterized by RSRP (e.g., for a first antenna port) is close enough in quality to the channel associated with the SRS as characterized by RSRP (e.g., for a second antenna port). In some aspects, a different measurement or indicator may be used for the channel characterization other than RSRP, such as received signal strength indicator (RSSI) or other channel quality indicator and/or measurement. The difference in RSRPs may be compared to a predetermined threshold which is a value defined by a standard, or received in a message from network unit 800, for example an RRC message via PDCCH. If the difference in RSRPs is above the threshold, then UE 115 may keep the default antenna port settings. If the difference in RSRPs is below a threshold, indicating that the SRS antenna port (e.g., the second antenna port) is comparable in channel quality to the PUSCH antenna port (e.g., the first antenna port), then UE 115 may perform action 508 as described below.

At action 508, UE 115 determines which antenna ports to use for PUSCH. Based on the determinations made at action 504 and 506, UE 115 may transmit PUSCH on the same antenna port as SRS so that it does not require an antenna switch between the two transmissions. If the SRS antenna port is of much inferior quality based on the determinations at actions 504 and 506, UE 115 may determine to keep the default antenna port settings.

At action 510, UE 115 transmits the PUSCHs and SRSs according to the antenna mapping determined at action 508. In some instances, the transmit power of the PUSCH communication may be increased so that transmissions using the non-default PUSCH antenna port are successful even with potentially worse channel conditions. In this regard, transmit power may be increased by UE 115 in response to a request or a configuration message such as a transmit power control (TPC) command from network unit. UE 115 may receive a TPC command via PDCCH, for example in a DCI message. Even with slightly worse channel conditions, the PUSCH communication transmitted over the non-default PUSCH antenna port may exhibit fewer CRC errors as the issues associated with antenna switching antenna ports between the SRS communication and the PUSCH communication may be eliminated.

At action 512, UE 115 continues to monitor channel performance. For example, UE 115 may monitor for CRC failures in PUSCHs which have remained on their default antenna ports (i.e., PUSCH resources in the second subset) by monitoring for retransmission requests from network unit

800 in a DCI message communicated via PDCCH. UE 115 may also monitor channel quality of the non-default antenna port for comparison. UE 115 also monitors downlink on both channels for downlink imbalance. For example, by monitoring RSRP and/or RSSI to determine if the channel associated with the default PUSCH antenna port has improved, or the default channel has degraded to the point that it would be beneficial to revert to the default port. UE 115 may monitor in order to determine when the gain due to no transition is beaten by degradation in the transmit performance of the antennas due to hand blockage or other channel variations.

UE 15 may revert to default antenna selections based on changing performance. The reversion may be based on a determination that failure rates of PUSCHs adjacent to SRSs on different antenna ports has improved, and/or that the non-default antenna being used has degraded beyond a predetermined point. For example, if CRC errors increase for PUSCHs on the non-default antenna port beyond the CRC errors that were originally measured, the antenna port mapping may be reverted by UE 115. In some aspects, UE 115 may wait to revert until there is a gap in PUSCH transmissions. For example, the reversion may be performed after a predetermined time in which no scheduled uplink transmissions occur from UE 115. UE 115 may also revert to a default PUSCH antenna port after a predetermined time regardless of uplink transmission scheduling.

Figure 6:
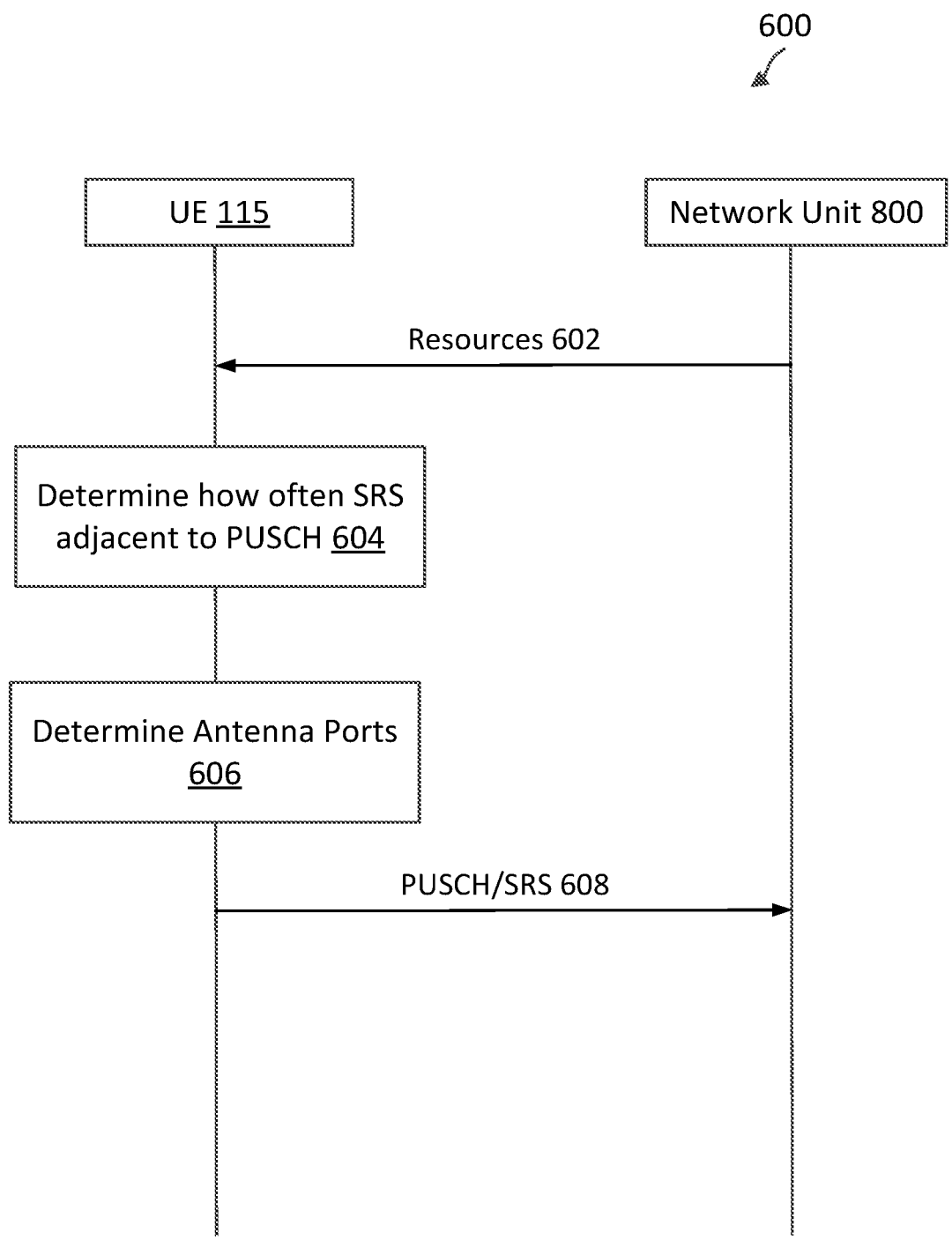
FIG. 6 is a signaling diagram according to some aspects of the present disclosure.

FIG. 6 is a signaling diagram 600 according to some aspects of the present disclosure. The diagram 600 is employed by a network unit 800 such as a BS 105, discussed with reference to FIG. 1, one or more components of disaggregated base station 200 (e.g., CU 210, DU 230, and/or RU 240) discussed with reference to FIGS. 2-3. Network unit 800 may utilize one or more components, such as the processor 802, the memory 804, the scheduling module 808, the transceiver 810, the modem 812, and the one or more antennas 816 shown in FIG. 8, and the UE 115 may utilize one or more components, such as the processor 902, the memory 904, the antenna switching module 908, the transceiver 910, the modem 912, and the one or more antennas 916 shown in FIG. 9. As illustrated, the signaling diagram 600 includes a number of enumerated actions, but aspects of FIG. 6 may include additional actions before, after, and in between the enumerated actions. In some aspects, one or more of the enumerated actions may be omitted, combined together, or performed in a different order.

At action 602, UE 115 receives, from network unit 800, an indication of PUSCH and SRS resources associated with respective antenna ports. The indication may be received, for example dynamically via DCI on PDCCH, an RRC configuration, or other methods. Each PUSCH resource of a first subset of the PUSCH resources may be directly before and/or after in time a respective SRS resource (e.g., in an adjacent symbol to the SRS resource). Each PUSCH resource of a second subset of the PUSCH resources may be spaced in time from any SRS resources (e.g., at least one intervening symbol is positioned between the PUSCH resource and any SRS resource). In some instances, a communication is considered to be directly before or directly after when there are no symbols between the communication and another communication (e.g., as discussed with respect to FIG. 4).

At action 604, UE 115 determines which SRS resource is scheduled adjacent to a PUSCH resource most often. In some aspects, the determination is deterministic and based on scheduling information known by UE 115. For example, PUSCH resources may be configured semi-statically via a configured scheduling grant received in an RRC message using a PBCH or PDCCH channel, which allows UE 115 to know well in advance when PUSCHs will occur with respect to SRSs. In other aspects, PUSCH resources are scheduled dynamically, for example via a PDCCH DCI message. Even when scheduled dynamically, typically a network unit will schedule resources in a predictable way. This allows for UE 115 to gather historical dynamic scheduling information and make inferences about likely future dynamic scheduling of PUSCH resources. In this sense, the determination by UE 115 that an SRS resource occurs adjacent to a PUSCH resource may be a probabilistic determination based on dynamic scheduling information which is gathered over a predetermined amount of time. Based on semi-static scheduling grants or historical scheduling information, UE 115 may determine which SRS resource occurs most often adjacent to a PUSCH resource, which makes that SRS resource the one most likely to cause PUSCH transmission failures due to antenna switching.

At action 606, UE 115 determines antenna ports. If a certain SRS resource is determined at action 604 to occur adjacent to a PUSCH resource more often than other SRS resources, it may be mapped to an antenna port which is less likely to cause antenna switching. For example, many UEs have a "default" antenna port, which may be referred to as ANT 0. While some antenna ports may be dedicated to UL or DL, some antenna ports such as ANT 0 have the ability to switch between UL and DL. By mapping the SRS resource which had the highest PUSCH/SRS transitions to a default port (e.g., ANT 0), this minimizes the likelihood of a need for switching antenna ports when going from SRS to PUSCH or vice versa.

At action 608, UE 115 transmits PUSCH transmission and SRSs according to the determination at action 606.

Figure 7:
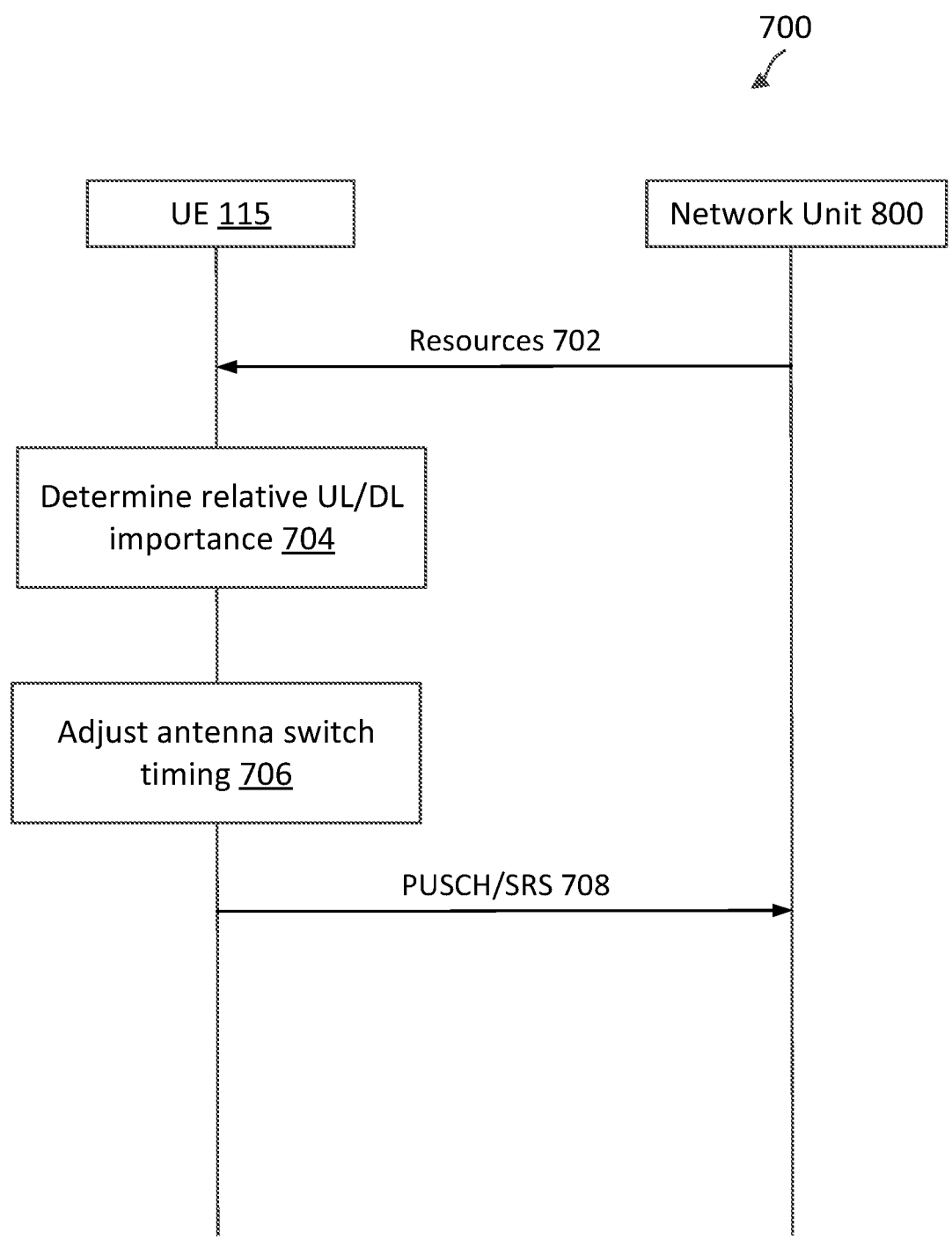
FIG. 7 is a signaling diagram according to some aspects of the present disclosure.

FIG. 7 is a signaling diagram 700 according to some aspects of the present disclosure. The diagram 700 is employed by a network unit 800 such as a BS 105, discussed with reference to FIG. 1, one or more components of disaggregated base station 200 (e.g., CU 210, DU 230, and/or RU 240) discussed with reference to FIGS. 2-3. Network unit 800 may utilize one or more components, such as the processor 802, the memory 804, the scheduling module 808, the transceiver 810, the modem 812, and the one or more antennas 816 shown in FIG. 8, and the UE 115 may utilize one or more components, such as the processor 902, the memory 904, the antenna switching module 908, the transceiver 910, the modem 912, and the one or more antennas 916 shown in FIG. 9. As illustrated, the signaling diagram 700 includes a number of enumerated actions, but aspects of FIG. 7 may include additional actions before, after, and in between the enumerated actions. In some aspects, one or more of the enumerated actions may be omitted, combined together, or performed in a different order.

At action 702, UE 115 receives, from network unit 800, an indication of PUSCH and SRS resources associated with respective antenna ports. The indication may be received, for example dynamically via DCI on PDCCH, an RRC configuration, or other methods. Each PUSCH resource of a first subset of the PUSCH resources may be directly before and/or after in time a respective SRS resource (e.g., in an adjacent symbol to the SRS resource). Each PUSCH resource of a second subset of the PUSCH resources may be spaced in time from any SRS resources (e.g., at least one intervening symbol is positioned between the PUSCH resource and any SRS resource). In some instances, a communication is considered to be directly before or directly after when there are no symbols between the communication and another communication (e.g., as discussed with respect to FIG. 4).

At action 704, UE 115 determines the relative importance of UL and DL. The relative importance of downlink compared to uplink may be based on one or more factors. For example, one factor may be based on a comparison of how many downlink layers are configured compared to a maximum possible number of downlink layers available. If not all available downlink layers are configured, this may indicate that downlink is not being heavily used currently and is therefore less important than uplink. Another factor may be the amount of block errors associated with PUSCHs not adjacent to SRSs being over a predetermined threshold. For example, this may indicate that the current conditions are such that there is a poor connection for PUSCH resources, which may be further worsened by choosing a suboptimal channel. Another factor may be whether the PUSCH transmission is type "B" in which case the performance of the first symbol of PUSCH is of extra importance, as the first symbol of type "B" PUSCH transmissions is a demodulation reference signal (DMRS).

At action 706, UE 115 adjusts antenna switch timing based on the determination at action 704. The antenna switch timing may be adjusted at a granularity of less than a symbol period. If uplink is determined to be less important based on a combination of one or more of the factors, then the transition time may be adjusted to happen where it interferes more with PUSCH. If downlink is determined to be less important based on a combination of one or more of the factors, then the transition time may be adjusted to happen where it interferes more with SRS. SRS is an uplink signal, but it is used to characterize the downlink channel via reciprocity, so an irregularity on SRS may affect downlink.

At action 708, UE 115 transmits PUSCH transmission and SRSs, with the timings are adjusted at action 706.

Figure 8:
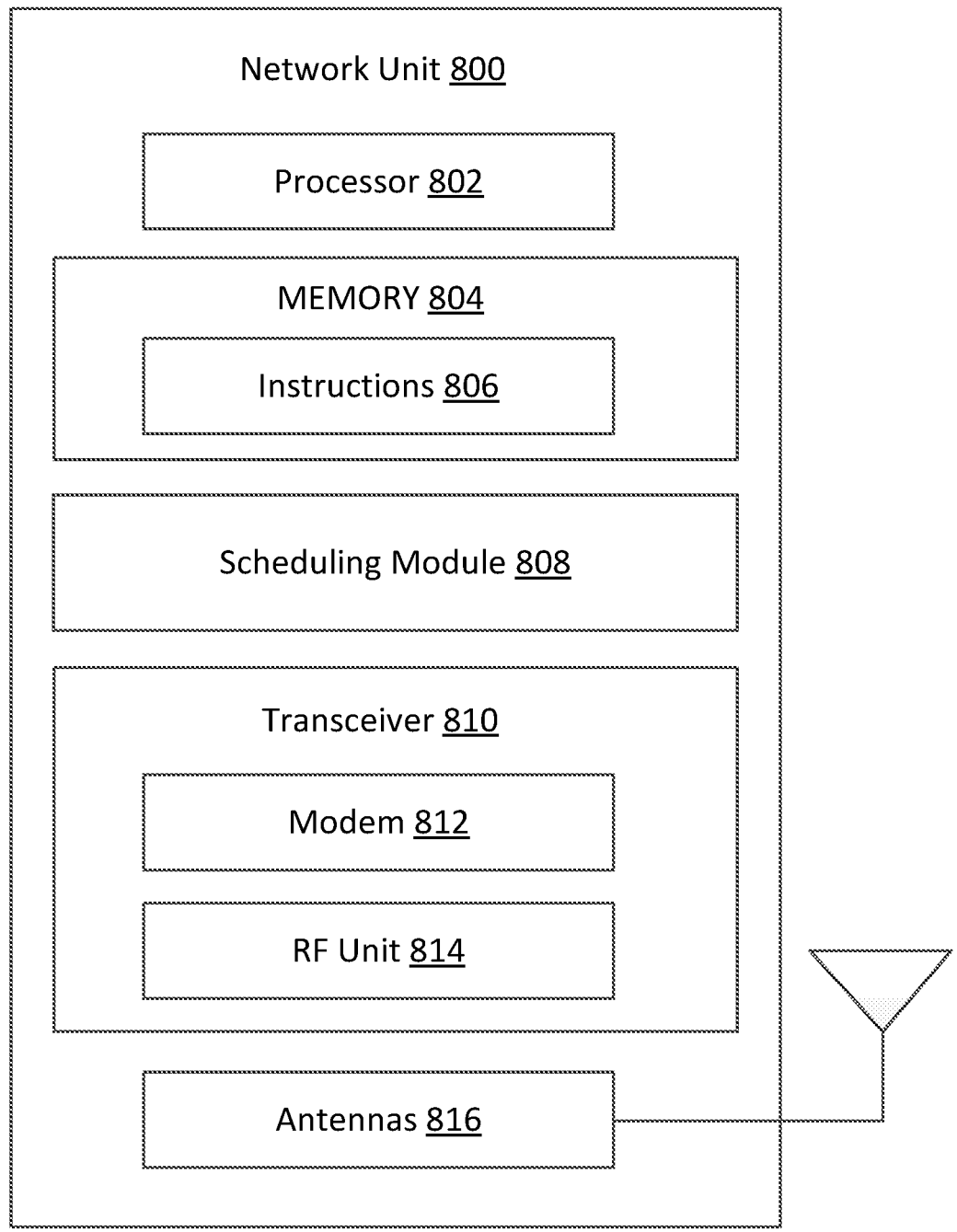
FIG. 8 illustrates a block diagram of a network unit according to some aspects of the present disclosure.

FIG. 8 is a block diagram of an exemplary network unit 800 according to some aspects of the present disclosure. The network unit 800 may be a BS 105 as discussed in FIG. 1, or be made up of disaggregated units as described with reference to FIGS. 2-3. As shown, the network unit 800 may include a processor 802, a memory 804, a scheduling module 808, a transceiver 810 including a modem subsystem 812 and a RF unit 814, and one or more antennas 816. These elements may be coupled with one another. The term "coupled" may refer to directly or indirectly coupled or connected to one or more intervening elements. For instance, these elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In some aspects, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 1-7 and 10-12. Instructions 806 may also be referred to as program code. The program code may be for causing a wireless communication device to perform these operations, for example by causing one or more processors (such as processor 802) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The scheduling module 808 may be implemented via hardware, software, or combinations thereof. For example, the scheduling module 808 may be implemented as a processor, circuit, and/or instructions 806 stored in the memory 804 and executed by the processor 802. In some examples, the scheduling module 808 can be integrated within the modem subsystem 812. For example, the scheduling module 808 can be implemented by a combination of software components (e.g., executed by a DSP or a general processor) and hardware components (e.g., logic gates and circuitry) within the modem subsystem 812. The scheduling module 808 may communicate with one or more components of network unit 800 to implement various aspects of the present disclosure, for example, aspects of FIGS. 1-7 and 10-12.

In some aspects, the scheduling module 808 may be configured to receive, from a UE, a rank indicator (RI). The RI may be received as part of channel state feedback information. The channel state feedback may be received, for example, via an RRC message, UL MAC CE, channel state information (CSI) message, a synchronization signal block (SSB), or other suitable communication, using PUCCH, PSCCH, or another suitable channel. The channel state feedback information may include a precoding matrix indicator (PMI) and/or a channel quality indicator (CQI) corresponding to the RI. The RI may define the number of possible transmission layers for the downlink transmission under specific channel conditions. The RI may correspond to a maximum number of uncorrelated paths that can be used for downlink transmission. The RI, however, may not contain information directly related to the number of antenna panels or modules used by the UE in achieving the indicated RI.

The scheduling module 808 may be configured to schedule a UE 115 with uplink resources. For example, SRS and PUSCH resources. Scheduling module 808 may further be configured to determine CRC failures on uplink transmissions, and request a retransmission accordingly. In some aspects, scheduling module 808 may adjust transmit power of UE transmissions, for example by a transmit power control (TPC) command sent in a scheduling message (e.g., DCI) to a UE 115.

As shown, the transceiver 810 may include the modem subsystem 812 and the RF unit 814. The transceiver 810 can be configured to communicate bi-directionally with other devices, such as the UEs 115 and/or BS 105 and/or another core network element. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., PUSCH, SRS, etc.) from the modem subsystem 812 (on outbound transmissions) or of transmissions originating from another source such as a UE 115, and/or UE 900. The RF unit 814 may be further configured to perform analog beamforming in conjunction with the digital beamforming. Although shown as integrated together in transceiver 810, the modem subsystem 812 and/or the RF unit 814 may be separate devices that are coupled together at the network unit 800 to enable the network unit 800 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices and provide the received data messages for processing and/or demodulation at the transceiver 810. The transceiver 810 may provide the demodulated and decoded data (e.g., PUSCH, SRS, etc.) to the scheduling module 808 for processing. The antennas 816 may include multiple antennas of similar or different designs in order to sustain multiple transmission links.

In an aspect, the network unit 800 can include multiple transceivers 810 implementing different RATs (e.g., NR and LTE). In an aspect, the network unit 800 can include a single transceiver 810 implementing multiple RATs (e.g., NR and LTE). In an aspect, the transceiver 810 can include various components, where different combinations of components can implement different RATs.

Figure 9:
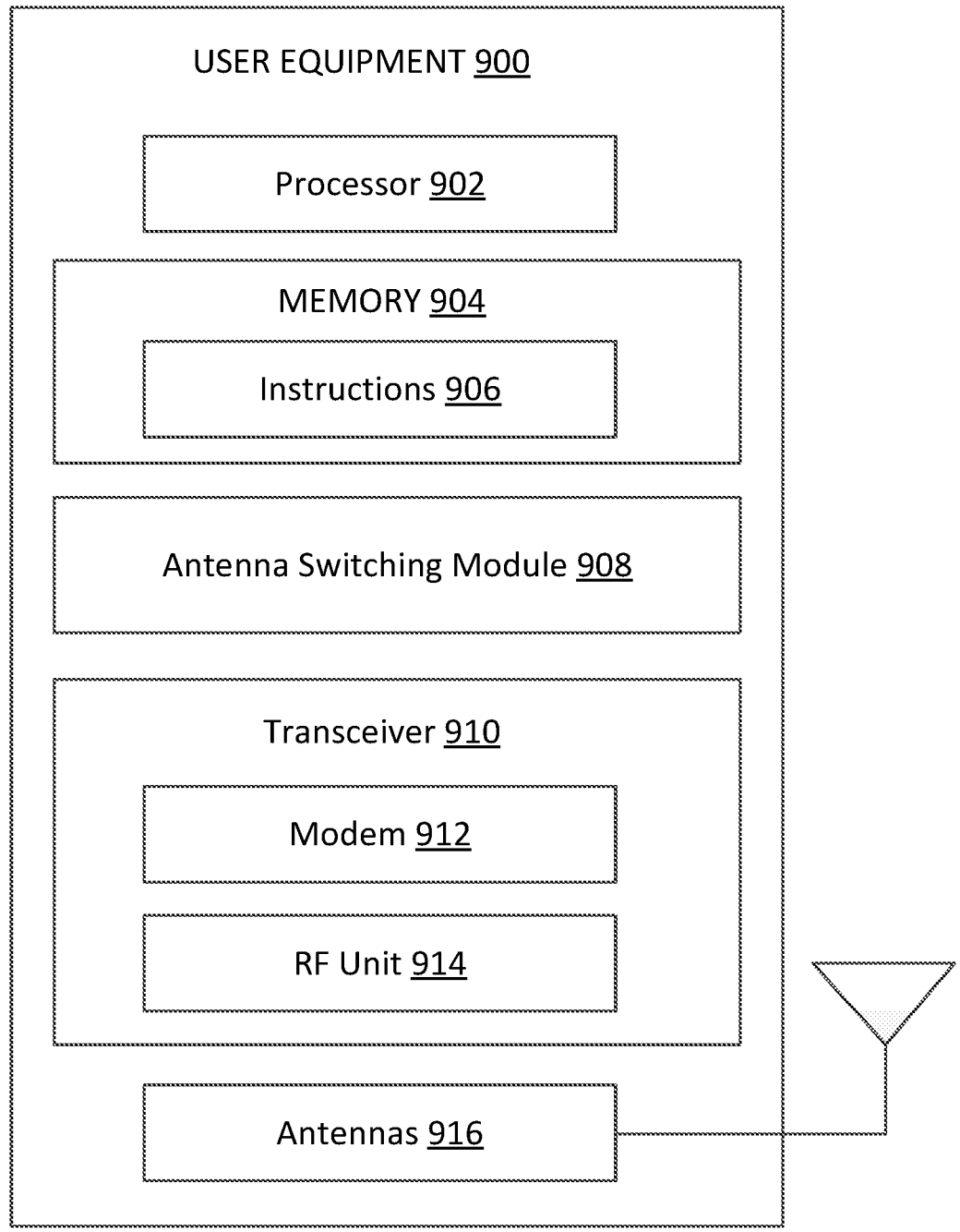
FIG. 9 illustrates a block diagram of a user equipment (UE) according to some aspects of the present disclosure.

FIG. 9 is a block diagram of an exemplary UE 900 according to some aspects of the present disclosure. The UE 900 may be a UE 115 as discussed in FIGS. 1-2. As shown, the UE 900 may include a processor 902, a memory 904, an antenna switching module 908, a transceiver 910 including a modem subsystem 912 and a radio frequency (RF) unit 914, and one or more antennas 916. These elements may be coupled with one another. The term "coupled" may refer to directly or indirectly coupled or connected to one or more intervening elements. For instance, these elements may be in direct or indirect communication with each other, for example via one or more buses.

The processor 902 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 904 includes a non-transitory computer-readable medium. The memory 904 may store, or have recorded thereon, instructions 906. The instructions 906 may include instructions that, when executed by the processor 902, cause the processor 902 to perform the operations described herein with reference to a UE 115 in connection with aspects of the present disclosure, for example, aspects of FIGS. 1-7 and 10-12. Instructions 906 may also be referred to as code, which may be interpreted broadly to include any type of computer-readable statement(s).

The antenna switching module 908 may be implemented via hardware, software, or combinations thereof. For example, the antenna switching module 908 may be implemented as a processor, circuit, and/or instructions 906 stored in the memory 904 and executed by the processor 902. In some aspects, the antenna switching module 908 can be integrated within the modem subsystem 912. For example, the antenna switching module 908 can be implemented by a combination of software components (e.g., executed by a DSP or a general processor) and hardware components (e.g., logic gates and circuitry) within the modem subsystem 912. The antenna switching module 908 may communicate with one or more components of UE 900 to implement various aspects of the present disclosure, for example, aspects of FIGS. 1-7 and 10-12.

In some aspects, antenna switching module 908 may be configured to monitor for indications of cyclic redundancy check (CRC) failures of PUSCH transmissions associated with PUSCH resources adjacent to SRS resources. If CRC failures are more than a threshold above the number of CRC errors for PUSCH resources not adjacent to SRS resources, then the antenna switching module 908 may perform mitigation actions. Antenna switching module 908 may, for example, determine if the SRS antenna port is a suitable antenna port for PUSCH transmission based on the difference in RSRP of the two channels. If it is a suitable channel, antenna switching module 908 may change the PUSCH antenna port to be the same as the SRS antenna port. In some aspects, antenna switching module 908 may revert the antenna ports to default settings if there is a change in channel performance.

In some aspects, antenna switching module 908 may map SRS antenna ports based on a determination that a particular SRS resource is most often adjacent to a PUSCH resource. The determination may be based on configured scheduling grants and/or a prediction based on historical scheduling.

In some aspects, antenna switching module may adjust antenna switch timing based on a determination of relative importance of UL or DL. The relative importance of downlink compared to uplink may be based on one or more factors. For example, one factor may be based on a comparison of how many downlink layers are configured compared to a maximum possible number of downlink layers available. If not all available downlink layers are configured, this may indicate that downlink is not being heavily used currently and is therefore less important than uplink. Another factor may be the amount of block errors associated with PUSCHs not adjacent to SRSs being over a predetermined threshold. For example, this may indicate that the current conditions are such that there is a poor connection for PUSCH resources, which may be further worsened by choosing a suboptimal channel. Another factor may be whether the PUSCH transmission is type "B" in which case the performance of the first symbol of PUSCH is of extra importance, as the first symbol of type "B" PUSCH transmissions is a demodulation reference signal (DMRS).

The antenna switch timing may be adjusted by antenna switch module 908 at a granularity of less than a symbol period. If uplink is determined to be less important based on a combination of one or more of the factors, then the transition time may be adjusted to happen where it interferes more with PUSCH. If downlink is determined to be less important based on a combination of one or more of the factors, then the transition time may be adjusted to happen where it interferes more with SRS.

As shown, the transceiver 910 may include the modem subsystem 912 and the RF unit 914. The transceiver 910 can be configured to communicate bi-directionally with other devices, such as the BSs 105 and 500. The modem subsystem 912 may be configured to modulate and/or encode the data from the memory 904 and/or the antenna switching module 908 according to a modulation and coding scheme (MCS), e.g., a low-density parity check (LDPC) coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., PDSCH, PDCCH, etc.) or of transmissions originating from another source such as a UE 115, or a BS 105. The RF unit 914 may be further configured to perform analog beamforming in conjunction with the digital beamforming. Although shown as integrated together in transceiver 910, the modem subsystem 912 and the RF unit 914 may be separate devices that are coupled together at the UE 900 to enable the UE 900 to communicate with other devices.

The RF unit 914 may provide the modulated and/or processed data, e.g., data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The transceiver 910 may provide the demodulated and decoded data (e.g., PDSCH, PDCCH, etc.) to the antenna switching module 908 for processing. The antennas 916 may include multiple antennas of similar or different designs in order to sustain multiple transmission links. Antennas 916 may include multiple antenna modules, each associated with a different antenna panel. Antenna panels may be used to transmit and/or receive using beamforming techniques.

In an aspect, the UE 900 can include multiple transceivers 910 implementing different RATs (e.g., NR and LTE). In an aspect, the UE 900 can include a single transceiver 910 implementing multiple RATs (e.g., NR and LTE). In an aspect, the transceiver 910 can include various components, where different combinations of components can implement different RATs.

Figure 10:
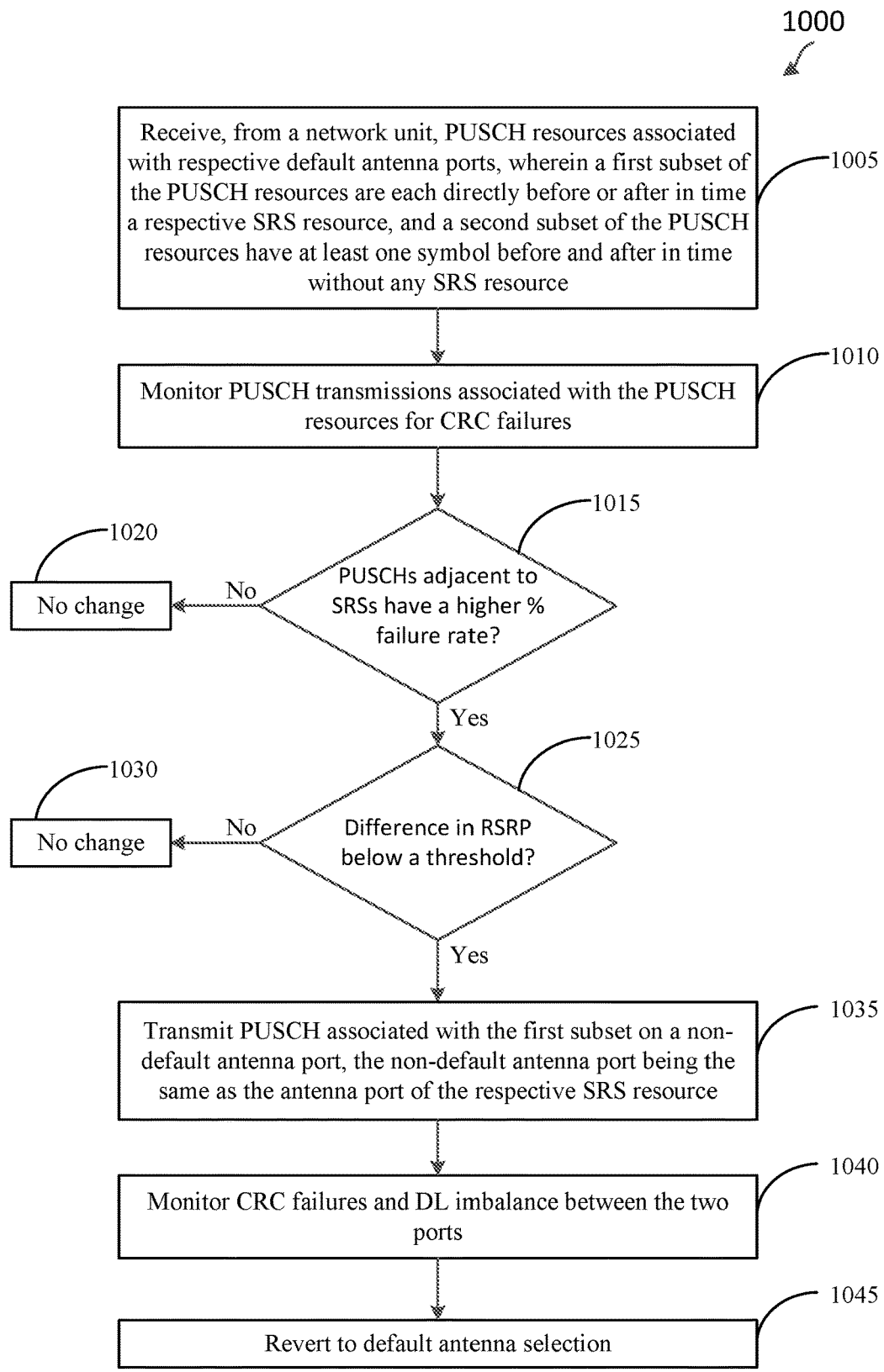
FIG. 10 is a flow diagram of a wireless communication method performed by a UE according to some aspects of the present disclosure.

FIG. 10 is a flow diagram illustrating a wireless communication method 1000 according to some aspects of the present disclosure. Aspects of the method 1000 can be executed by a computing device (e.g., a processor, processing circuit, and/or other suitable component) of a wireless communication device or other suitable means for performing the blocks. In one aspect, a UE 115, or 900, may perform the method 1000 utilizing components such as the processor 902, the memory 904, the antenna switching module 908, the transceiver 910, the modem 912, and the one or more antennas 916 shown in FIG. 9.

As illustrated, the method 1000 includes a number of enumerated blocks, but aspects of the method 1000 may include additional blocks before, after, and in between the enumerated blocks. In some aspects, one or more of the enumerated blocks may be omitted or performed in a different order.

At block 1005, a UE (e.g., UE 115, UE 900, or other UE) receives, from a network unit (e.g., BS 105, network unit 800, CU 210, DU 230, and/or RU 240), an indication of PUSCH resources associated with respective default antenna ports. The indication may be received, for example dynamically via DCI on PDCCH, an RRC configuration, or other methods. Each PUSCH resource of a first subset of the PUSCH resources may be directly before and/or after in time a respective SRS resource (e.g., in an adjacent symbol to the SRS resource). Each PUSCH resource of a second subset of the PUSCH resources may be spaced in time from any SRS resources (e.g., at least one intervening symbol is positioned between the PUSCH resource and any SRS resource). In some instances, a communication is considered to be directly before or directly after when there are no symbols between the communication and another communication (e.g., as discussed with respect to FIG. 4).

At block 1010, the UE monitors for indications of cyclic redundancy check (CRC) failures of PUSCH transmissions associated with the PUSCH resources. For example, the UE may determine a CRC failure based on a retransmission request from the network unit in a DCI message communicated via PDCCH. If a predetermined amount of time has lapsed since a PUSCH transmission without a retransmission request, the UE may assume that there was no CRC error. The UE may track PUSCH failures for PUSCH resources that are adjacent to SRS resources (e.g., the first subset of PUSCH resources) separately from PUSCH failures for PUSCH resources that are not adjacent to SRS resources (e.g., the second subset of PUSCH resources). In some aspects, PUSCH resources with an SRS directly before or after the PUSCH resource are tracked. In other aspects, only PUSCH resources with SRSs before (but not after) are tracked. In this regard, interference with the beginning of a PUSCH communication may be more detrimental than interference at the end of the PUSCH communication. Further, in some instances, SRS transmissions may be deemed less important than PUSCH transmissions.

At decision block 1015, the UE determines whether PUSCH resources adjacent to SRS resources (e.g., the first subset of PUSCH resources) have a higher percentage failure rate than PUSCH resources not adjacent to an SRS (e.g., the second subset of PUSCH resources) based on the observed CRC failures at block 1010. If CRC errors are not more than a predetermined threshold higher when adjacent to an SRS, then method 1000 proceeds to block 1020 in which there is no change to the antenna port settings. For example, if CRC errors for PUSCH resources in the first subset are 4%, and PUSCH resource in the second subset are 5%, and the predetermined threshold is a difference of 2%, then the UE may determine to continue using default antennas. If CRC errors are more than a predetermined threshold higher when adjacent to an SRS, then method 1000 proceeds to decision block 1025. The predetermined threshold may be defined by a standard, or may be configured by a message received from a network unit, for example as an RRC message on PDCCH.

At decision block 1025, the UE determines whether a difference in the reference signal received power (RSRP) associated with the antennas of interest is less than a predetermined threshold. For example, for a PUSCH and SRS pair, each mapped to a different antenna port, the UE may determine whether the channel associated with the PUSCH as characterized by RSRP (e.g., for a first antenna port) is close enough in quality to the channel associated with the SRS as characterized by RSRP (e.g., for a second antenna port). The difference in RSRPs may be compared to a predetermined threshold which is a value defined by a standard, or received in a message from a network unit, for example an RRC message via PDCCH. If the difference in RSRPs is above the threshold, then method 1000 proceeds to block 1030 in which there is no change to the antenna port settings. If the difference in RSRPs is below a threshold, indicating that the SRS antenna port (e.g., the second antenna port) is comparable in channel quality to the PUSCH antenna port (e.g., the first antenna port), then method 1000 proceeds to block 1035. In some aspects, the PUSCH antenna port (e.g., the first antenna port) is a default PUSCH antenna port. In some aspects, the SRS antenna port (e.g., the second antenna port) is a default SRS antenna port. In some aspects, a different measurement or indicator may be used for the channel characterization other than RSRP, such as received signal strength indicator (RSSI) or other channel quality indicator and/or measurement.

At block 1035, the UE transmits a PUSCH communication associated with the first subset of PUSCH resources using a non-default PUSCH antenna port. The non-default PUSCH antenna port may be the same antenna port as the respective SRS resource (e.g., the second antenna port and/or the default SRS antenna port). In this way, the antenna port may stay the same when transmitting a PUSCH communication directly before or directly after the corresponding SRS, thereby avoiding the antenna switching issues, including any associated delays. In some aspects, the non-default PUSCH antenna port may slightly underperform in terms of channel quality relative to the default PUSCH antenna port, even though the non-default PUSCH antenna port is close enough in terms of RSRP to the default PUSCH antenna port to be suitable for use. In some instances, the transmit power of the PUSCH communication may be increased so that transmissions using the non-default PUSCH antenna port are successful even with potentially worse channel conditions. In this regard, transmit power may be increased by the UE in response to a request or a configuration message such as a transmit power control (TPC) command from network unit. The UE may receive a TPC command via PDCCH, for example in a DCI message. Even with slightly worse channel conditions, the PUSCH communication transmitted over the non-default PUSCH antenna port may exhibit fewer CRC errors as the issues associated with antenna switching antenna ports between the SRS communication and the PUSCH communication may be eliminated.

At block 1040, the UE monitors the PUSCH transmissions for CRC failures. For example, the UE may monitor for CRC failures in PUSCHs which have remained on their default antenna ports (i.e., PUSCH resources in the second subset) by monitoring for retransmission requests from the network unit in a DCI message communicated via PDCCH. The UE may also monitor channel quality of the non-default antenna port for comparison. The UE also monitors downlink on both channels for downlink imbalance. For example by monitoring RSRP and/or RSSI to determine if the channel associated with the default PUSCH antenna port has improved, or the default channel has degraded to the point that it would be beneficial to revert to the default port. The UE may monitor in order to determine when the gain due to no transition is beaten by degradation in the transmit performance of the antennas due to hand blockage or other channel variations.

At block 1045, the UE reverts to default antenna selections. The reversion may be based on a determination that failure rates of PUSCHs adjacent to SRSs on different antenna ports has improved, and/or that the non-default antenna being used has degraded beyond a predetermined point. For example, if CRC errors increase for PUSCHs on the non-default antenna port beyond the CRC errors that were originally measured, the antenna port mapping may be reverted by the UE. In some aspects, the UE may wait to revert until there is a gap in PUSCH transmissions. For example, the reversion may be performed after a predetermined time in which no scheduled uplink transmissions occur from the UE. The UE may also revert to a default PUSCH antenna port after a predetermined time regardless of uplink transmission scheduling.

Figure 11:
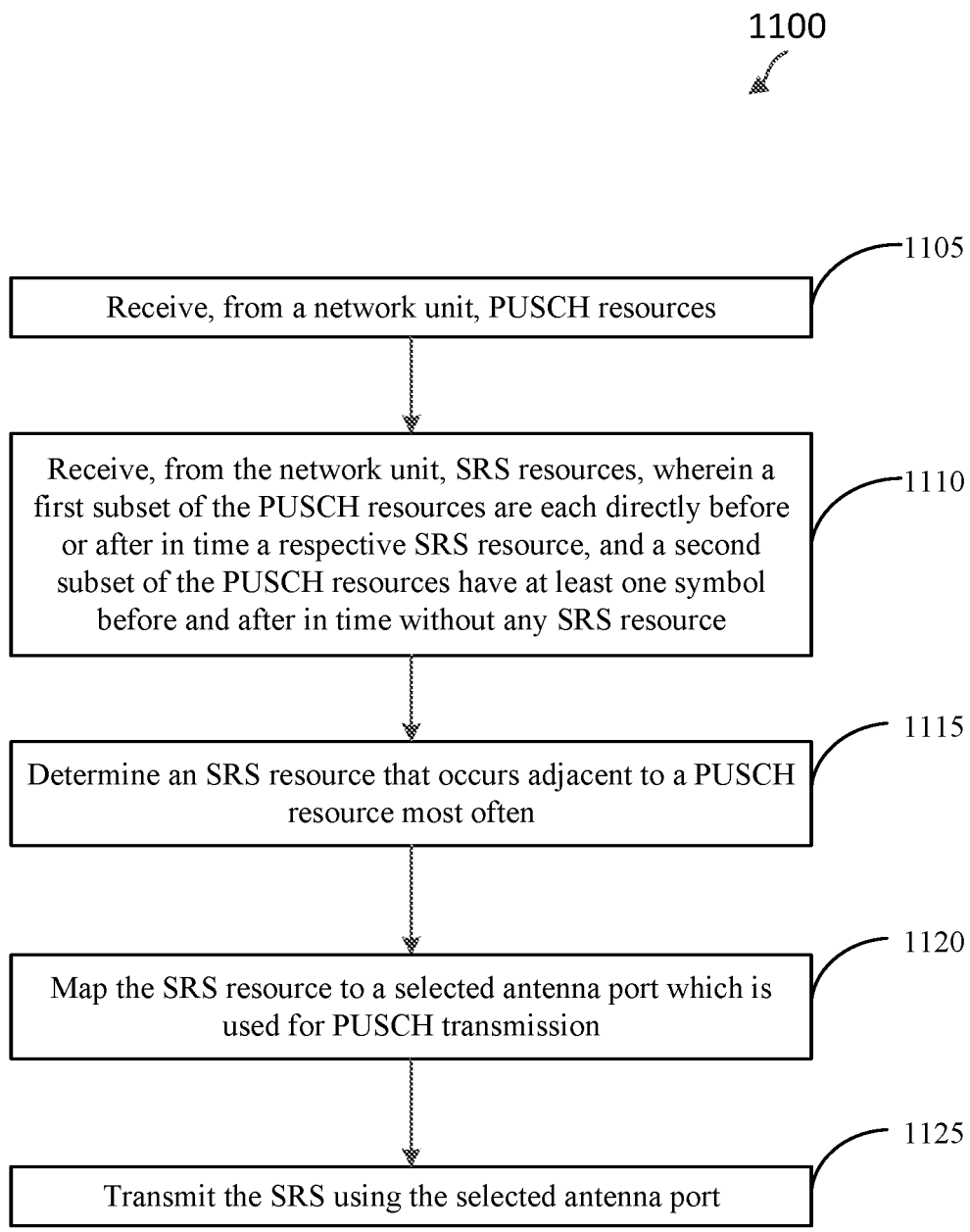
FIG. 11 is a flow diagram of a wireless communication method performed by a UE according to some aspects of the present disclosure.

FIG. 11 is a flow diagram illustrating a wireless communication method 1100 according to some aspects of the present disclosure. Aspects of the method 1100 can be executed by a computing device (e.g., a processor, processing circuit, and/or other suitable component) of a wireless communication device or other suitable means for performing the blocks. In one aspect, a UE 115, or 900, may perform the method 1100 utilizing components such as the processor 902, the memory 904, the antenna switching module 908, the transceiver 910, the modem 912, and the one or more antennas 916 shown in FIG. 9.

As illustrated, the method 1100 includes a number of enumerated blocks, but aspects of the method 1100 may include additional blocks before, after, and in between the enumerated blocks. In some aspects, one or more of the enumerated blocks may be omitted or performed in a different order.

At block 1105, a UE (e.g., UE 115, UE 900, or other UE) receives, from a network unit (e.g., BS 105, network unit 800, CU 210, DU 230, and/or RU 240), an indication of PUSCH resources. The indication may be received, for example dynamically via DCI on PDCCH, an RRC configuration, or other methods.

At block 1110, the UE receives, from the network unit, an indication of SRS resources. Each PUSCH resource of a first subset of the PUSCH resources may be directly before and/or after in time a respective SRS resource (e.g., in an adjacent symbol to the SRS resource). Each PUSCH resource of a second subset of the PUSCH resources may be spaced in time from any SRS resources (e.g., at least one intervening symbol is positioned between the PUSCH resource and any SRS resource). In some instances, a communication is considered to be directly before or directly after when there are no symbols between the communication and another communication (e.g., as discussed with respect to FIG. 4).

At block 1115, the UE determines an SRS resource that occurs adjacent to a PUSCH resource most often. In some aspects, the determination is deterministic and based on scheduling information known by the UE. For example, PUSCH resources may be configured semi-statically via a configured scheduling grant received in an RRC message using a PBCH or PDCCH channel, which allows the UE to know well in advance when PUSCHs will occur with respect to SRSs. In other aspects, PUSCH resources are scheduled dynamically, for example via a PDCCH DCI message. Even when scheduled dynamically, typically a network unit will schedule resources in a predictable way. This allows for a UE to gather historical dynamic scheduling information and make inferences about likely future dynamic scheduling of PUSCH resources. In this sense, the determination by the UE that an SRS resource occurs adjacent to a PUSCH resource may be a probabilistic determination based on dynamic scheduling information which is gathered over a predetermined amount of time. Based on semi-static scheduling grants or historical scheduling information, the UE may determine which SRS resource occurs most often adjacent to a PUSCH resource, which makes that SRS resource the one most likely to cause PUSCH transmission failures due to antenna switching.

At block 1120, the UE maps the SRS resource to a selected antenna port which is used for PUSCH transmission. For example, many UEs have a "default" antenna port, which may be referred to as ANT 0. While some antenna ports may be dedicated to UL or DL, some antenna ports such as ANT 0 have the ability to switch between UL and DL. By mapping the SRS resource to a port which is used for uplink and downlink, this minimizes the likelihood of a need for switching antenna ports when going from SRS to PUSCH or vice versa. This may be because a UE which is currently transmitting and receiving relatively low amounts of data, may only use a single antenna port for UL and DL, which generally would be a default antenna port such as ANT 0.

At block 1125, the UE transmits the SRS using the selected antenna port.

Figure 12:
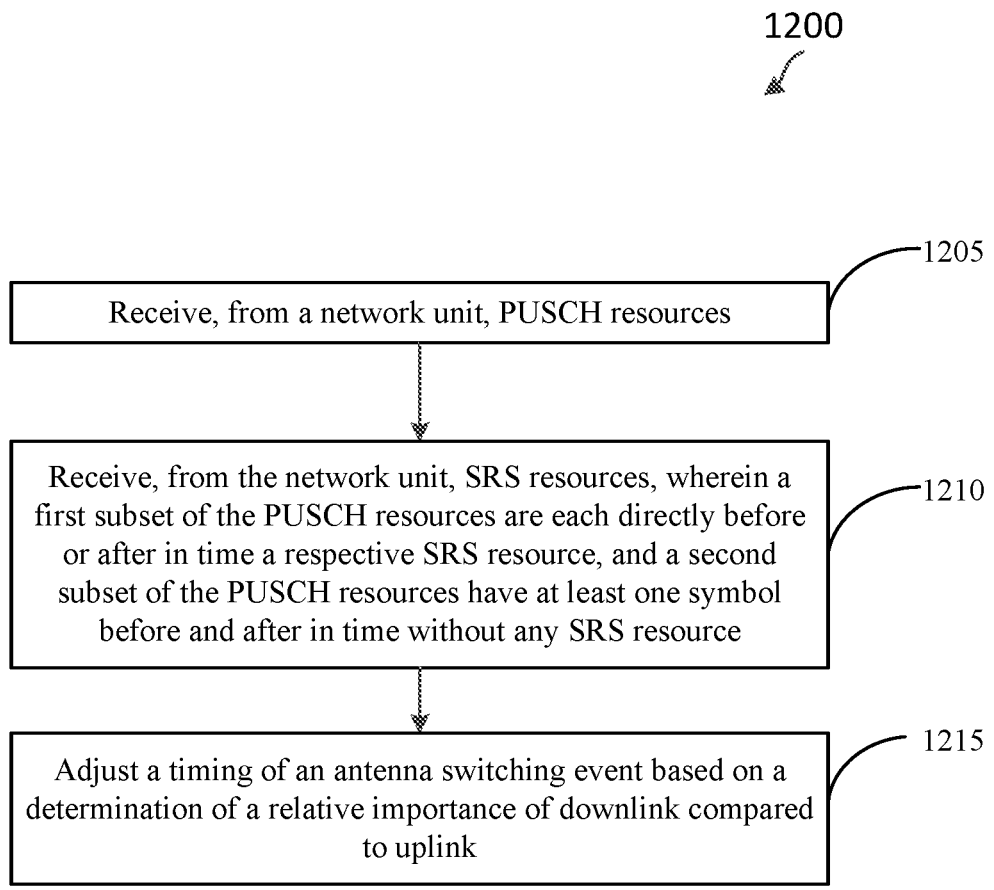
FIG. 12 is a flow diagram of a wireless communication method performed by a UE according to some aspects of the present disclosure.

FIG. 12 is a flow diagram illustrating a wireless communication method 1200 according to some aspects of the present disclosure. Aspects of the method 1200 can be executed by a computing device (e.g., a processor, processing circuit, and/or other suitable component) of a wireless communication device or other suitable means for performing the blocks. In one aspect, a UE 115, or 900, may perform the method 1200 utilizing components such as the processor 902, the memory 904, the antenna switching module 908, the transceiver 910, the modem 912, and the one or more antennas 916 shown in FIG. 9.

As illustrated, the method 1200 includes a number of enumerated blocks, but aspects of the method 1200 may include additional blocks before, after, and in between the enumerated blocks. In some aspects, one or more of the enumerated blocks may be omitted or performed in a different order.

At block 1205, a UE (e.g., UE 115, UE 900, or other UE) receives, from a network unit (e.g., BS 105, network unit 800, CU 210, DU 230, and/or RU 240), PUSCH resources.

At block 1210, the UE receives, from the network unit, an indication of SRS resources. Each PUSCH resource of a first subset of the PUSCH resources may be directly before and/or after in time a respective SRS resource (e.g., in an adjacent symbol to the SRS resource). Each PUSCH resource of a second subset of the PUSCH resources may be spaced in time from any SRS resources (e.g., at least one intervening symbol is positioned between the PUSCH resource and any SRS resource). In some instances, a communication is considered to be directly before or directly after when there are no symbols between the communication and another communication (e.g., as discussed with respect to FIG. 4).

At block 1215, the UE adjusts a timing of an antenna switching event based on a determination of a relative importance of downlink compared to uplink.

The relative importance of downlink compared to uplink may be based on one or more factors. For example, one factor may be based on a comparison of how many downlink layers are configured compared to a maximum possible number of downlink layers available. If not all available downlink layers are configured, this may indicate that downlink is not being heavily used currently and is therefore less important than uplink. Another factor may be the amount of block errors associated with PUSCHs not adjacent to SRSs being over a predetermined threshold. For example, this may indicate that the current conditions are such that there is a poor connection for PUSCH resources, which may be further worsened by choosing a suboptimal channel. Another factor may be whether the PUSCH transmission is type "B" in which case the performance of the first symbol of PUSCH is of extra importance, as the first symbol of type "B" PUSCH transmissions is a demodulation reference signal (DMRS).

Based on one or more of these factors, the UE may determine that uplink or downlink is of more relative importance currently. Accordingly, the timing of the antenna switching may be adjusted. The antenna switch timing may be adjusted at a granularity of less than a symbol period. If uplink is determined to be less important based on a combination of one or more of the factors, then the transition time may be adjusted to happen where it interferes more with PUSCH. If downlink is determined to be less important based on a combination of one or more of the factors, then the transition time may be adjusted to happen where it interferes more with SRS. SRS is an uplink signal but it is used to characterize the downlink channel via reciprocity, so an irregularity on SRS may affect downlink.

Further aspects of the present disclosure include the following:

Aspect 1. A method of wireless communication, comprising:
receiving, by a user equipment (UE) from a network unit, a plurality of physical uplink shared channel (PUSCH) resources associated with respective default antenna ports, wherein a first subset of the plurality of PUSCH resources are each directly before or after in time a respective sounding reference signal (SRS) resource without an intervening symbol, and wherein a second subset of the plurality of PUSCH resources have at least one symbol before and after in time without any SRS resource;
transmitting a PUSCH associated with the first subset on a non-default antenna port, the non-default antenna port being the same as the antenna port of the respective SRS resource, in response to:
a failure rate of the first subset being above a first predetermined threshold higher than a failure rate of the second subset; and
a channel measurement associated with the non-default antenna port meeting a predetermined requirement.

Aspect 2. The method of aspect 1, further comprising:
transmitting the PUSCH associated with the first subset on a default antenna port in response to detecting an improvement in the failure rate of the first subset.

Aspect 3. The method of any of aspects 1-2, further comprising:
increasing a transmit power of the PUSCH associated with the first subset when using the non-default antenna port to a higher power than used for PUSCH on a default antenna port.

Aspect 4. The method of any of aspects 1-3, further comprising:
reverting PUSCH transmission to the respective default antenna port from the non-default antenna port after a predetermined time with no scheduled uplink transmissions from the UE.

Aspect 5. The method of any of aspects 1-4, wherein the failure rate is a cyclic redundancy check (CRC) failure rate.

Aspect 6. The method of any of aspects 1-5, wherein the channel measurement includes at least one of a reference signal received power (RSRP) or a received signal strength indicator (RSSI) measurement.

Aspect 7. The method of any of aspects 1-6, wherein the predetermined requirement includes a difference between measurements associated with default and non-default antenna ports.

Aspect 8. The method of aspect 7, wherein the predetermined requirement includes the difference being below a second predetermined threshold.

Aspect 9. The method of aspect 8, wherein the first predetermined threshold and the second predetermined threshold are configured by one or more messages from the network unit.

Aspect 10. A user equipment (UE), comprising:
a transceiver configured to:
receive, from a network unit, a plurality of physical uplink shared channel (PUSCH) resources associated with respective default antenna ports, wherein a first subset of the plurality of PUSCH resources are each directly before or after in time a respective sounding reference signal (SRS) resource without an intervening symbol, and wherein a second subset of the plurality of PUSCH resources have at least one symbol before and after in time without any SRS resource;
transmit a PUSCH associated with the first subset on a non-default antenna port, the non-default antenna port being the same as the antenna port of the respective SRS resource, in response to:
a failure rate of the first subset being above a first predetermined threshold higher than a failure rate of the second subset; and
a channel measurement associated with the non-default antenna port meeting a predetermined requirement.

Aspect 11. The UE of aspect 10, wherein the transceiver is further configured to:
transmit the PUSCH associated with the first subset on a default antenna port in response to detecting an improvement in the failure rate of the first subset.

Aspect 12. The UE of any of aspects 10-11, wherein the transceiver is further configured to:
increase a transmit power of the PUSCH associated with the first subset when using the non-default antenna port to a higher power than used for PUSCH on a default antenna port.

Aspect 13. The UE of any of aspects 10-12, wherein the transceiver is further configured to:
revert PUSCH transmission to the respective default antenna port from the non-default antenna port after a predetermined time with no scheduled uplink transmissions from the UE.

Aspect 14. The UE of any of aspects 10-13, wherein the failure rate is a cyclic redundancy check (CRC) failure rate.

Aspect 15. The UE of any of aspects 10-14, wherein the channel measurement includes at least one of a reference signal received power (RSRP) or a received signal strength indicator (RSSI) measurement.

Aspect 16. The UE of any of aspects 10-15, wherein the predetermined requirement includes a difference between measurements associated with default and non-default antenna ports.

Aspect 17. The UE of aspect 16, wherein the predetermined requirement includes the difference being below a second predetermined threshold.

Aspect 18. The UE of aspect 17, wherein the first predetermined threshold and the second predetermined threshold are configured by one or more messages from the network unit.

Aspect 19. A method of wireless communication, comprising:
receiving, by a user equipment (UE) from a network unit, a plurality of physical uplink shared channel (PUSCH) resources;
receiving, by the UE from the network unit, a plurality of sounding reference signal (SRS) resources, wherein a first subset of the plurality of PUSCH resources are each directly before or after in time a respective sounding reference signal (SRS) resource of the plurality of SRS resources without an intervening symbol, and wherein a second subset of the plurality of PUSCH resources have at least one symbol before and after in time without any SRS resource;
determining, by the UE, an SRS resource of the plurality of SRS resources that most often occurs adjacent in time to a PUSCH resource of the plurality of PUSCH resources;
mapping, by the UE, the SRS resource to a selected antenna port which is used for PUSCH transmission; and
transmitting, by the UE, an SRS using the selected antenna port.

Aspect 20. The method of aspect 19, wherein the determining the SRS resource is based on a configured grant scheduling information.

Aspect 21. The method of any of aspects 19-20, wherein the determining the SRS resource is a prediction based on prior dynamic scheduling information.

Aspect 22. The method of aspect 21, wherein the prior dynamic scheduling information is gathered over a predetermined amount of time.

Aspect 23. A method of wireless communication, comprising:
receiving, by a user equipment (UE) from a network unit, a plurality of physical uplink shared channel (PUSCH) resources;
receiving, by the UE from the network unit, a plurality of sounding reference signal (SRS) resources, wherein a first subset of the plurality of PUSCH resources are each directly before or after in time a respective sounding reference signal (SRS) resource of the plurality of SRS resources without an intervening symbol, and wherein a second subset of the plurality of PUSCH resources have at least one symbol before and after in time without any SRS resource;
adjusting a timing of an antenna switching event based on a determination of a relative importance of downlink compared to uplink.

Aspect 24. The method of aspect 23, wherein the antenna switching event is adjusted to occur closer in time to a PUSCH transmission in response to the determination being that downlink is more important than uplink.

Aspect 25. The method of aspect 23, wherein the antenna switching event is adjusted to occur closer in time to an SRS transmission in response to the determination being that downlink is less important than uplink.

Aspect 26. The method of any of aspects 23-25, wherein the timing of the antenna switching event is less than a symbol in time.

Aspect 27. The method of any of aspects 23-26, wherein the determination is performed by the UE.

Aspect 28. The method of any of aspects 23-27, wherein the determination is based on a comparison of a configured number of downlink layers with a maximum number of downlink layers.

Aspect 29. The method of any of aspects 23-28, wherein the determination is based on an amount of block errors associated with the first subset being above a predetermined threshold.

Aspect 30. The method of any of aspects 23-29, wherein the determination is based on a PUSCH transmission being configured to begin with a demodulation reference signal (DMRS).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication, comprising:
   receiving, by a user equipment (UE) from a network unit, a plurality of physical uplink shared channel (PUSCH) resources associated with respective first antenna ports, wherein a first subset of the plurality of PUSCH resources are each directly before or after in time a respective sounding reference signal (SRS) resource without an intervening symbol, and wherein a second subset of the plurality of PUSCH resources have at least one symbol before and after in time without any SRS resource;
   transmitting a PUSCH associated with the first subset on a second antenna port, the second antenna port being the same as an antenna port of the respective SRS resource, in response to:
     a failure rate of the first subset being above a first predetermined threshold higher than a failure rate of the second subset; and
     a channel measurement associated with the second antenna port meeting a predetermined requirement.

2. The method of claim 1, further comprising:
   transmitting the PUSCH associated with the first subset on a first antenna port in response to detecting an improvement in the failure rate of the first subset.

3. The method of claim 1, further comprising:
   increasing a transmit power of the PUSCH associated with the first subset when using the second antenna port to a higher power than used for PUSCH on a first antenna port.

4. The method of claim 1, further comprising:
   reverting PUSCH transmission to a first antenna port from the second antenna port after a predetermined time with no scheduled uplink transmissions from the UE.

5. The method of claim 1, wherein the failure rate of the first subset is a cyclic redundancy check (CRC) failure rate.

6. The method of claim 1, wherein the channel measurement includes at least one of a reference signal received power (RSRP) or a received signal strength indicator (RSSI) measurement.

7. The method of claim 1, wherein the predetermined requirement includes a difference between measurements associated with first antenna ports and second antenna ports.

8. The method of claim 7, wherein the predetermined requirement includes the difference being below a second predetermined threshold.

9. The method of claim 8, wherein the first predetermined threshold and the second predetermined threshold are configured by one or more messages from the network unit.

10. A user equipment (UE), comprising:
    one or more memories;
    a transceiver; and
    one or more processors coupled to the one or more memories and the transceiver, the one or more memories storing instructions that are executable by the one or more processors, configured individually or in any combination, to cause the UE to:
      receive, from a network unit, a plurality of physical uplink shared channel (PUSCH) resources associated with respective first antenna ports, wherein a first subset of the plurality of PUSCH resources are each directly before or after in time a respective sounding reference signal (SRS) resource without an intervening symbol, and wherein a second subset of the plurality of PUSCH resources have at least one symbol before and after in time without any SRS resource;
transmit a PUSCH associated with the first subset on a second antenna port, the second antenna port being the same as an antenna port of the respective SRS resource, in response to:
a failure rate of the first subset being above a first predetermined threshold higher than a failure rate of the second subset; and
a channel measurement associated with the second antenna port meeting a predetermined requirement.

11. The UE of claim 10, wherein the one or more processors are further configured individually or in any combination, to cause the UE to:
transmit the PUSCH associated with the first subset on a first antenna port in response to detecting an improvement in the failure rate of the first subset.

12. The UE of claim 10, wherein the one or more processors are further configured individually or in any combination, to cause the UE to:
increase a transmit power of the PUSCH associated with the first subset when using the second antenna port to a higher power than used for PUSCH on a first antenna port.

13. The UE of claim 10, wherein the one or more processors are further configured individually or in any combination, to cause the UE to:
revert PUSCH transmission to a first antenna port from the second antenna port after a predetermined time with no scheduled uplink transmissions from the UE.

14. The UE of claim 10, wherein the failure rate of the first subset is a cyclic redundancy check (CRC) failure rate.

15. The UE of claim 10, wherein the channel measurement includes at least one of a reference signal received power (RSRP) or a received signal strength indicator (RSSI) measurement.

16. The UE of claim 10, wherein the predetermined requirement includes a difference between measurements associated with first antenna ports and second antenna ports.

17. The UE of claim 16, wherein the predetermined requirement includes the difference being below a second predetermined threshold.

18. The UE of claim 17, wherein the first predetermined threshold and the second predetermined threshold are configured by one or more messages from the network unit.

19. A user equipment (UE), comprising:
one or more memories;
a transceiver; and
one or more processors coupled to the one or more memories and the transceiver, the one or more memories storing instructions that are executable by the one or more processors, configured individually or in any combination, to cause the UE to:
receive, from a network unit, a plurality of physical uplink shared channel (PUSCH) resources;
receive, from the network unit, a plurality of sounding reference signal (SRS) resources, wherein a first subset of the plurality of PUSCH resources are each directly before or after in time a respective SRS resource of the plurality of SRS resources without an intervening symbol, and wherein a second subset of the plurality of PUSCH resources have at least one symbol before and after in time without any SRS resource;
determine an SRS resource of the plurality of SRS resources that most often occurs adjacent in time to a PUSCH resource of the plurality of PUSCH resources;
map the SRS resource to a selected antenna port which is used for PUSCH transmission; and
transmit an SRS using the selected antenna port.

20. The UE of claim 19, wherein the determining the SRS resource is based on a configured grant scheduling information.

21. The UE of claim 19, wherein the determining the SRS resource is a prediction based on prior dynamic scheduling information.

22. The UE of claim 21, wherein the prior dynamic scheduling information is gathered over a predetermined amount of time.

23. A user equipment (UE), comprising:
one or more memories;
a transceiver; and
one or more processors coupled to the one or more memories and the transceiver, the one or more memories storing instructions that are executable by the one or more processors, configured individually or in any combination, to cause the UE to:
receive, from a network unit, a plurality of physical uplink shared channel (PUSCH) resources;
receive, from the network unit, a plurality of sounding reference signal (SRS) resources, wherein a first subset of the plurality of PUSCH resources are each directly before or after in time a respective SRS resource of the plurality of SRS resources without an intervening symbol, and wherein a second subset of the plurality of PUSCH resources have at least one symbol before and after in time without any SRS resource; and
adjust a timing of an antenna switching event based on a determination of a relative importance of downlink compared to uplink,
wherein the determination is based on at least one of:
a comparison of a configured number of downlink layers with a maximum number of downlink layers,
an amount of block errors associated with the first subset being above a predetermined threshold, or
a PUSCH transmission being configured to begin with a demodulation reference signal (DMRS).

24. The UE of claim 23, wherein the antenna switching event is adjusted to occur closer in time to the PUSCH transmission in response to the determination being that the downlink is more important than the uplink.

25. The UE of claim 23, wherein the antenna switching event is adjusted to occur closer in time to an SRS transmission in response to the determination being that downlink is less important than uplink.

26. The UE of claim 23, wherein the timing of the antenna switching event is less than a symbol in time.

27. The UE of claim 23, wherein the determination is performed by the UE.

28. The UE of claim 23, wherein the determination is based on the comparison of the configured number of downlink layers with the maximum number of downlink layers.

29. The UE of claim 23, wherein the determination is based on the amount of block errors associated with the first subset being above the predetermined threshold.

30. The UE of claim 23, wherein the determination is based on the PUSCH transmission being configured to begin with the DMRS.

* * * * *